United States Patent
Nomichi et al.

(10) Patent No.: US 7,562,675 B2
(45) Date of Patent: Jul. 21, 2009

(54) VALVE DEVICE

(75) Inventors: Kaoru Nomichi, Ono (JP); Seiji Ishii, Ono (JP); Yutaka Suzuki, Kobe (JP); Makoto Ninomiya, Kobe (JP); Yuko Funakubo, Akashi (JP)

(73) Assignee: Kabushiki Kaisha Kawasaki Precision Machinery, Kobe-shi (JP)

( * ) Notice: Subject to any disclaimer, the term of this patent is extended or adjusted under 35 U.S.C. 154(b) by 0 days.

(21) Appl. No.: 11/629,738

(22) PCT Filed: Apr. 26, 2005

(86) PCT No.: PCT/JP2005/007899

§ 371 (c)(1),
(2), (4) Date: May 29, 2007

(87) PCT Pub. No.: WO2005/124203

PCT Pub. Date: Dec. 29, 2005

(65) Prior Publication Data

US 2007/0261746 A1    Nov. 15, 2007

(30) Foreign Application Priority Data

Jun. 17, 2004    (JP) .............................. 2004-180259

(51) Int. Cl.
*F16K 1/44* (2006.01)

(52) U.S. Cl. ............................ 137/624.21; 137/625.48; 251/368

(58) Field of Classification Search ............ 137/624.21, 137/884; 251/368, 359–365
See application file for complete search history.

(56) References Cited

U.S. PATENT DOCUMENTS

| 4,124,195 | A | * | 11/1978 | Braun et al. ................. 251/333 |
| 4,146,056 | A | | 3/1979 | Buchanan |
| 4,402,338 | A | | 9/1983 | Moller et al. |
| 4,633,898 | A | * | 1/1987 | Denk ..................... 137/315.05 |
| 4,688,757 | A | * | 8/1987 | Cook et al. ................. 251/210 |
| 5,524,865 | A | * | 6/1996 | Uchisawa et al. ........... 251/331 |
| 5,782,269 | A | * | 7/1998 | Seaney et al. .......... 137/630.22 |

FOREIGN PATENT DOCUMENTS

| JP | 54-65831 | 5/1979 |
| JP | 60-192172 | 9/1985 |
| JP | 56-35868 | 4/1991 |
| JP | 8-93953 | 4/1996 |
| JP | 9-217677 | 8/1997 |
| JP | 2003-049997 | 2/2003 |

OTHER PUBLICATIONS

International Search Report for PCT/JP2005/007899.
Microfilm of the specification and drawings annexed to the request of Japanese Utility Model Application No. 33053/1986 (Laid-open No. 146060/1987) (NOK Corp.). Sep. 14, 1987.

* cited by examiner

*Primary Examiner*—Kevin L Lee
(74) *Attorney, Agent, or Firm*—Marshall, Gerstein & Borun LLP

(57) ABSTRACT

A plunger (45) and a piston (46) are displaceably held in a housing (104) for opening and closing a valve path (107) defined in the housing (104), and a single common seat block (44) provided for the plunger (45) and the piston (46) is fixed to the housing (104) and has seat portions (47) each formed from a soft material for respective of the plunger (45) and the piston (46) to be pressed thereon. This arrangement provides a valve device which is simplified in structure and can be manufactured with reduced man-hour.

10 Claims, 14 Drawing Sheets

VALVE DEVICE

CROSS-REFERENCE TO RELATED APPLICATION

The present application claims the benefit of priority of International Patent Application No. PCT/JP2005/007899 filed on Apr. 26, 2005. The entire text of the priority application is incorporated herein by reference in its entirety.

TECHNICAL FIELD

The present invention relates to a valve device for use in a hydraulic apparatus for example.

BACKGROUND ART

FIG. 12 is a cross-sectional view showing an on-off valve 1 according to a first prior art. The on-off valve 1 includes a valve body 3 axially displaceably held within a housing 2, and a spring member 4 fitted over the valve body 3 for exerting a spring force on a flange portion of the valve body 3 in first (one) axial direction x1. The housing 2 is formed with a supply port 5 and an outlet port 6, and a valve seat 7 is formed to circumscribe the supply port 5. The valve body 3 closes a valve path when a contact portion thereof is pressed on the valve seat 7 and opens the valve path when the contact portion moves away from the valve seat 7. The contact portion of the valve body 3 is formed with a seat portion 8 comprising rubber or resin for preventing the contact portion and the valve seat 7 from forming a clearance therebetween during valve closure so as to ensure reliable closure of the valve path. When the valve body 3 is thus pressed (seated) on the valve seat 7, the interior of the housing 2 is partitioned into a first pressure chamber continuous with the supply port 5 and a second pressure chamber continuous with the outlet port 6. The on-off valve 1 is also provided with a solenoid 10 in the housing 2 for exerting an electromagnetic force on the valve body 3 comprising a ferromagnetic material in a second (opposite) axial direction x2, thereby on-off controlling fluid communication between the supply port 5 and the outlet port 6 cooperatively with the spring member 4.

When the solenoid 10 is off, the valve body 3 is applied with the spring force working in the axial direction x1 by the spring member 4 to assume a cutoff position where the seat portion 8 is pressed on the valve seat 7, thereby cutting off the fluid communication between the supply port 5 and the outlet port 6. When the solenoid 10 is on, the valve body 3 is applied with the electromagnetic force working in the second axial direction x2 by the solenoid 10 to assume a spaced position where the seat portion 8 is spaced apart from the valve sheet 7, thereby providing fluid communication between the supply port 5 and the outlet port 6. Thus, the fluid communication between the supply port 5 and the outlet port 6 can be switched on and off.

FIG. 13 is a cross-sectional view showing a pressure reducing valve 11 according to a second prior art. The pressure reducing valve 11 includes a valve body 15 held within a housing 14 defining therethrough a valve path connecting a primary port 12 and a secondary port 13. The valve body 15 regulates the opening of the valve path. The valve body 15 is linked to a diaphragm 16 held within the housing 14 via a valve shaft 17. The diaphragm 15 receives the pressure of fluid in a pressure chamber 18 held at a secondary pressure and applies the valve body 15 with a driving force working in such a direction as to close the valve path based on that pressure of fluid. The pressure reducing valve 11 is also provided with a pressure control spring 19 for applying the valve body 15 with a driving force working in such a direction as to open the valve path. Thus, the pressure reducing valve 11 is configured to adjust the secondary pressure to the pressure set by the pressure control spring 19.

The valve body 15 closes the valve path when the contact portion thereof is pressed on a valve seat 20 formed in the housing and opens the valve path when the contact portion moves away from the valve seat 20. The contact portion of the valve body 15 is formed with a seat portion 21 comprising rubber or resin for preventing the contact portion and the valve seat 20 from forming a clearance therebetween during valve closure so as to ensure reliable closure of the valve path.

FIG. 14 is a cross-sectional view showing a valve device 22 according to a third prior art. The valve device 22 includes an on-off valve 23 and a pressure reducing valve 24, which are formed integrally with a housing 25 defining a flow path so as to be located intermediately of the flow path through which fluid flows from the supply side down to the outlet side. The on-off valve 23 and the pressure reducing valve 24 include respective valve bodies 26 and 27, each of which closes the valve path when the contact portion thereof is pressed on a respective one of valve seat portions 28 and 29 formed in the housing 25 and opens the valve path when the contact portion moves away from a respective one of the valve seat portions 28 and 29. The contact portions of the respective valve bodies 26 and 27 are formed with respective seat portions 30 and 31 each comprising rubber or resin for preventing each of the contact portions and a respective one of the valve seat portions from forming a clearance therebetween during valve closure so as to ensure reliable closure of the valve path (see patent document 1 for example).

Patent document 1: Japanese Patent Laid-Open Publication No. 2003-49997 (p. 4-5, FIG. 3)

DISCLOSURE OF INVENTION

Problems to be Solved by Invention

The on-off valve 1 according to the first prior art and the pressure reducing valve 11 according to the second prior art have their respective contact portions provided with the respective seat portions 8 and 21 each comprising rubber or resin for preventing the contact portion of each of the valve bodies 3 and 15 and a respective one of the valve seat portions from forming a clearance therebetween during valve closure so as to ensure reliable closure of the valve path. The seat portions 8 and 21 provided on the respective valve bodies 3 and 15 are formed through complicated processing and, for this reason, the valve bodies 3 and 15 might be damaged during the formation of the seat portions 8 and 21. Therefore, it is necessary to form the seat portions 8 and 21 on the respective valve bodies 3 and 15 so as to suppress the occurrence of damage to the valve bodies 3 and 15, thus incurring increases in the man-hour and in the manufacturing cost.

In the valve device according to the third prior art, the on-off valve 23 and the pressure reducing valve 24 are provided with the respective valve bodies 26 and 27 which are formed with the respective seat portions 30 and 31. Though the on-off valve 23 and the pressure reducing valve 24 are formed integrally with the single housing 25, it is necessary to provide the seat portions 30 and 31 on the respective valve bodies 26 and 27, which results in the valve device 22 having a complicated structure and incurs an increase in the manufacturing cost.

Means for Solving Problems

An object of the present invention is to provide a valve device which is simplified in structure and can be manufactured with reduced man-hour.

The present invention provides a valve device comprising:
a housing in which valve path is defined;
plural valve bodies displaceably held in the housing for opening and closing the valve path; and
a single common seat block provided for the plural valve bodies and fixed to the housing for the plural valve bodies to be pressed thereon, the seat block having seat portions each comprising a soft material for the valve bodies to be pressed on respective of the seat portions, wherein:
the seat block comprises a base comprising a hard material, and a seat-forming member fitted on the base to form the seat portions each comprising the soft material;
the base is fixed to the housing;
the seat-forming member is fitted on the base by being held between the base and the housing; and
the base and the seat-forming member provide sealing when a closed loop sharp ridge formed on the base is brought into contact with the seat-forming member.

According to the present invention, the plural valve bodies are displaceably held in the housing. These valve bodies open and close the valve path. The single common seat block is provided for the plural valve bodies and fixed to the housing. The seat portions of the seat block for the valve bodies to be pressed on the respective seat portions each comprise the soft material.

According to the present invention, the seat block comprises the base comprising the hard material, and the seat-forming member fitted on the base. The seat-forming member forms the seat portions each comprising the soft material.

According to the present invention, the base is fixed to the housing. The seat-forming member is fitted on the base by being held between the base and the housing.

In the present invention, the housing comprises plural housing members joined together, and the seat block has a sandwiched portion and the sandwiched portion is fixed to the housing to be sandwiched between the housing members.

According to the present invention, the housing comprises plural housing members joined together. The seat block having the sandwiched portion is fixed to the housing by the sandwiched portion sandwiched between the housing members.

In the present invention, the seat block is fixed to the housing by thread engagement.

According to the present invention, the seat block is fixed to the housing by thread engagement.

In the present invention, the seat block is fixed to the housing by partial deformation of the housing made by caulking.

According to the present invention, the seat block is fixed to the housing by partial deformation of the housing made by caulking.

ADVANTAGE OF INVENTION

According to the present invention wherein the single common seat block provided for the plural valve bodies is fixed to the housing and, particularly, the valve device is structured to allow the valve bodies to be pressed on the respective seat portions formed on the single seat block, the following advantages will result. Plural seat parts, i.e., plural seat blocks for plural valve bodies to be pressed thereon, which are required by the prior art, are not needed. Stated otherwise, the valve device structured to use the single common seat block sharingly has a simplified structure as compared to the conventional valve device and hence can reduce the required parts count. Thus, it is possible to reduce the valve device manufacturing cost.

Also, since the seat block includes the seat portions each comprising the soft material, each valve body need not be formed with any seat portion as in the prior art. Accordingly, there is no possibility of damaging the valve body in forming such a seat portion. Thus, the seat portions can be formed without any damage to the valve bodies. Therefore, it is possible to reduce the man-hour required to form the seat portions and hence realize a reduction in the valve device manufacturing cost corresponding to the reduction in the man-hour. The valve device structured to fix the seat block to the housing has the following advantages. That is, it is possible to fix the seat block to the housing after the seat portions have been formed on the seat block. In this case, the housing itself can have a simplified structure as compared to the case where the housing itself is formed with the seat portions or the seat block is formed integral with the housing. Thus, it is possible to reduce the mold manufacturing cost and like costs. Moreover, the man-hour required for assemblage of the valve device can be reduced.

According to the present invention, the seat-forming member is fitted on the base to form the seat portions. In this way, the seat block including the seat portions each comprising the soft material can be formed easily. Thus, it is possible to realize the seat block by fitting the seat-forming member on the base. Since the seat-forming member for forming the seat portions each comprising the soft material is fitted on the base comprising the hard material, the adhesion between the base and the seat-forming member can be enhanced. Therefore, it is possible to form the seat block easily.

According to the present invention, the seat block including the seat portions can be realized easily by bonding the seat-forming member to the base.

According to the present invention, the base is fixed to the housing. In this way, it is possible to realize the fixing of the seat block. Also, the seat-forming member is fitted on the base by being held between the base and the housing. This feature makes it easy to fit the seat-forming member on the base. Thus, the seat block can be formed easily.

According to the present invention, the base and the seat-forming member can achieve sealing by bringing the closed loop sharp ridge formed on the base into abutment with the seat-forming member. This feature offers the following advantages. That is, there are decreased limitations in providing sealing as compared to the case where an O-ring is used to provide sealing, while at the same time a reduced area is required to achieve sealing. Further, it is possible to simplify the structure of the seat block, lower the parts count and reduce the valve device manufacturing cost as compared to the case where the O-ring is used to provide sealing.

According to the present invention, the seat block can be fixed to the housing by the arrangement wherein the sandwiched portion of the seat block is sandwiched between the plural housing members which are joined together to form the housing. This feature makes it possible to fix the seat block at the same time with the assemblage of the housing by joining the plural housing members together. Thus, the seat block can be fixed to the housing easily.

According to the present invention, the seat block is fixed to the housing by thread engagement. For this reason, the seat block can be fixed to the housing while being checked for its positional accuracy. Thus, it is possible to realize the valve device in which the positional accuracy of the seat block relative to the housing and to each of the valve bodies is high.

According to the present invention, the seat block is fixed to the housing by partial deformation of the housing made by caulking. For this reason, the seat block can be fixed to the housing while being checked for its positional accuracy. Thus, it is possible to realize the valve device in which the positional accuracy of the seat block relative to the housing and to each of the valve bodies is high.

DESCRIPTION OF REFERENCE CHARACTERS

Figure 1:
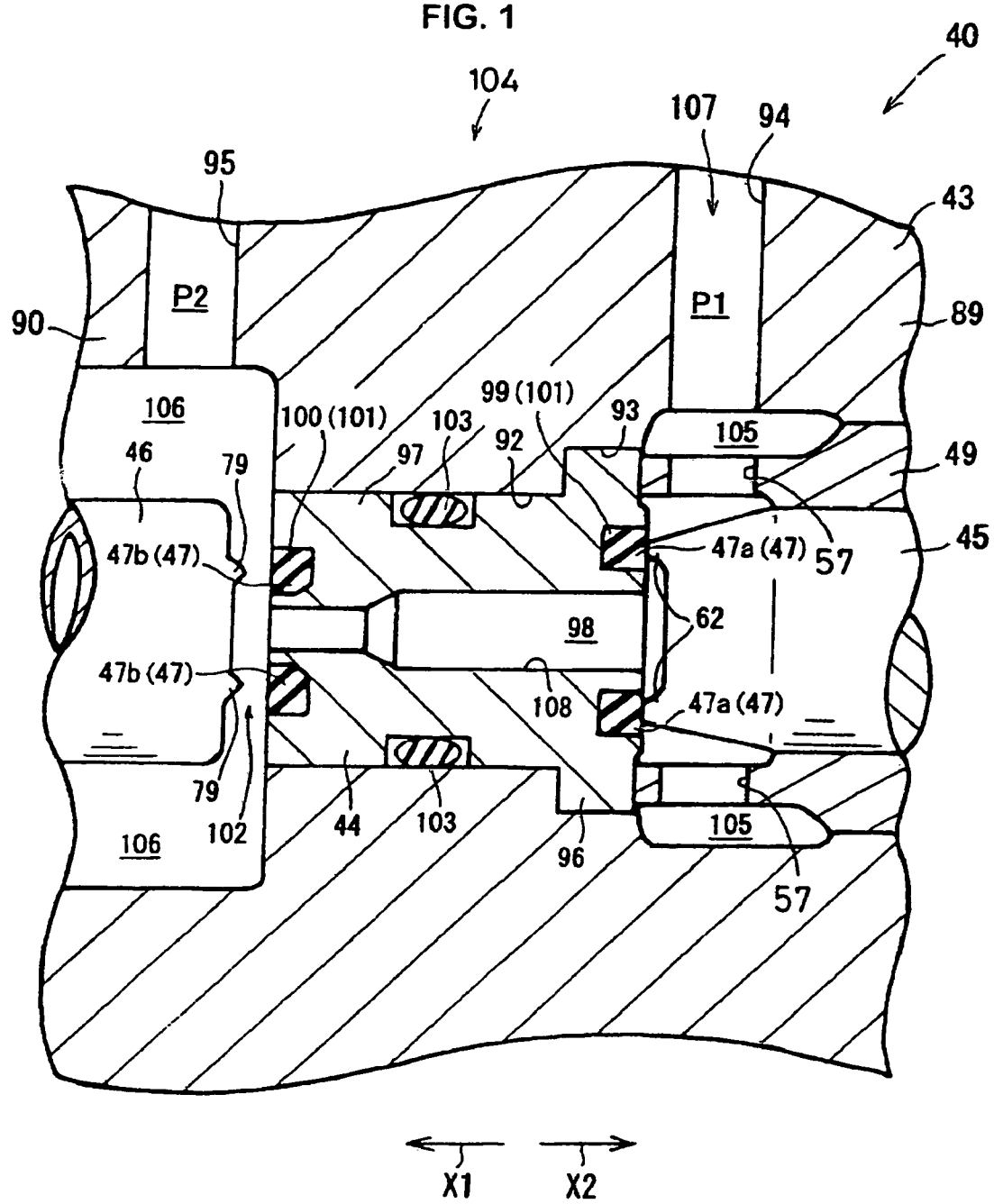
FIG. 1 is a partially enlarged cross-sectional view showing a valve device according to a first embodiment of the present invention.

40 . . . valve device
43 . . . seat block housing
44 . . . seat block
45 . . . plunger
46 . . . piston
47 . . . seat portion
49 . . . on-off valve housing
69 . . . pressure reducing valve housing
97 . . . seat block body (base)
101 . . . seat-forming member
107 . . . valve path
104 . . . housing
115 . . . ridge
96,113 . . . flange portion

BEST MODE FOR CARRYING OUT THE INVENTION

Figure 2:
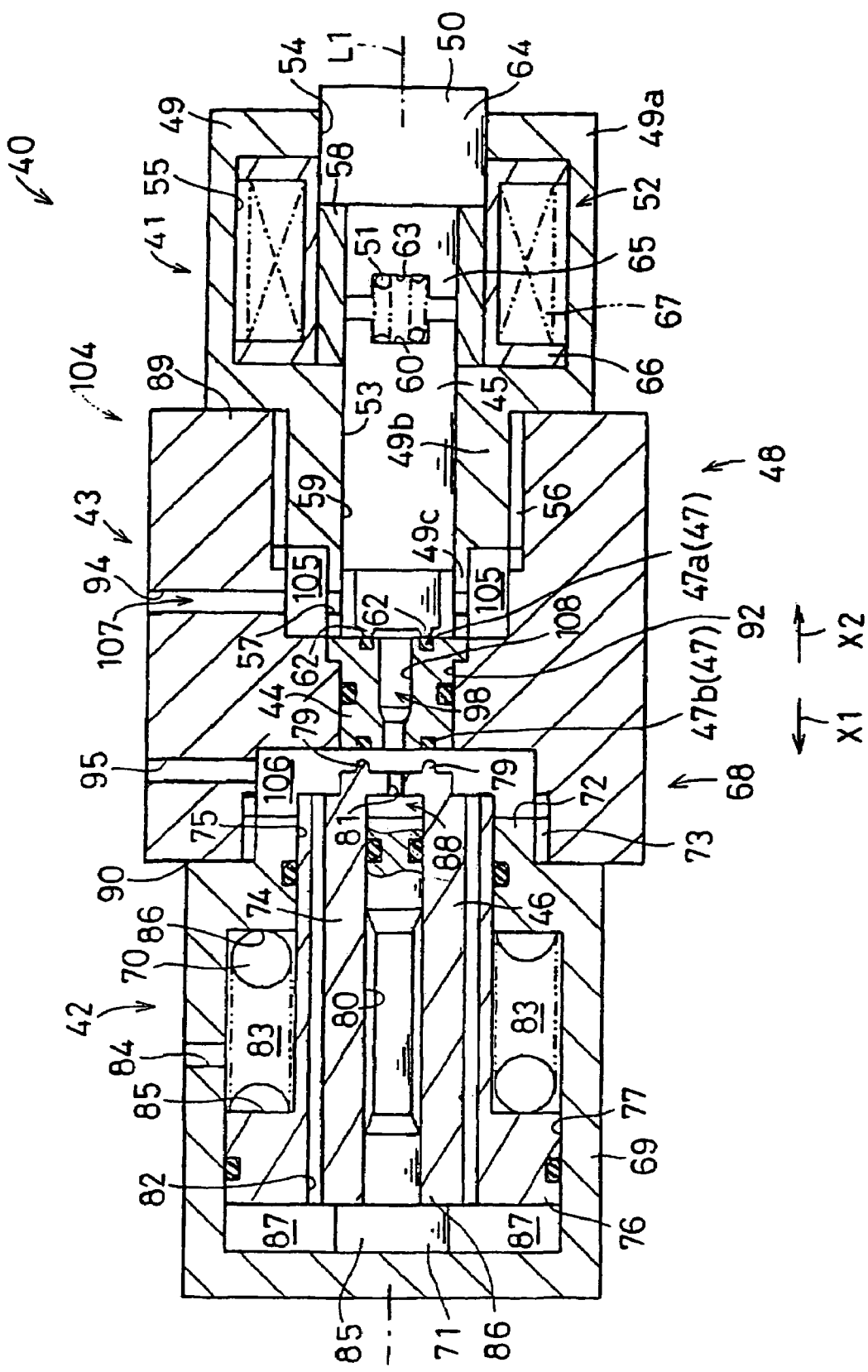
FIG. 2 is a cross-sectional view showing the valve device.

FIG. 1 is a partially enlarged cross-sectional view showing a valve device 40 according to a first embodiment of the present invention. FIG. 2 is a cross-sectional view showing the valve device 40. The valve device 40 is a valve located intermediately of a flow path through which fluid flows from a supply side down to an outlet side and configured to control the output of fluid supplied for reducing primary pressure P1 of fluid supplied from the supply side to secondary pressure P2 of fluid. The valve device 40 includes an on-off valve section 41, a pressure reducing valve section 42, a seat block housing 43, and a seat block 44. The on-off valve section 41 and the pressure reducing valve section 42 are mechanically connected to the seat block housing 43 so that a plunger 45 and a piston 46 are faced to each other. The plunger 45 is located in the on-off valve section 41, while the piston 46 located in the pressure reducing valve section 42. The seat block 44 is configured to allow the plunger 45 and the piston 46 to be pressed thereon and formed with seat portions 47 on portions of the seat block on which the plunger 45 and the piston 46 are to be pressed. In the present embodiment, the on-off valve section 41, pressure reducing valve section 42, seat block housing 43 and seat block 44 are arranged coaxially with each other. However, the present invention is not limited to such a coaxial arrangement.

The on-off valve section 41, together with the seat block housing 43 and the seat block 44, forms an on-off valve 48. The on-off valve 48 is located intermediately of the flow path through which fluid flows from the supply side down to the outlet side and configured to control the output of fluid supplied. The on-off valve section 41 includes an on-off valve housing 49, plunger 45, fixed magnetic pole 50, a spring member 51 for on-off valve, and a solenoid 52. The on-off valve housing 49, plunger 45, fixed magnetic pole 50 and on-off valve spring member 51 are arranged coaxially with each other, and the axes of respective of these components are substantially coincident with axis L1 of the on-off valve section 41. The condition expressed by "substantially coincident with" is meant to include a condition expressed by "coincident with".

The on-off valve housing 49, which is one of housing members, is formed from a ferromagnetic material and includes a first on-off valve housing portion 49a having a cylindrical shape, a second on-off valve housing portion 49b having a cylindrical shape, and a third on-off valve housing portion 49c having a cylindrical shape. The axes of respective of the first, second and third on-off valve housing portions 49a, 49b and 49c are substantially coincident with the axis L1 of the on-off valve section 41. The first on-off valve housing portion 49a shaped cylindrical has a small bore portion 53 on first axial end side, a medium bore portion 54 on the other axial end side, and a large bore portion 55 intermediate between the second (opposite) axial end sides. The small bore portion 53 is a bore portion for the plunger 45 to be inserted therein; the medium bore portion 54 is a bore portion for the fixed magnetic pole 50 to be fixedly fitted therein; and the large bore portion 55 is a bore portion for accommodating the solenoid 52 therein. The axes of respective of the small bore portion 53, medium bore portion 54 and large bore portion 55 are substantially coincident with each other.

The second on-off valve housing portion 49b is formed into a cylindrical shape having a smaller diameter than that of the first on-off valve housing portion 49a and has a first (one) axial end portion protruding from the small bore portion 53 of the first on-off valve housing portion 49a in a first (one) axial direction X1. The second on-off valve housing portion 49b has an inner peripheral surface substantially flush with the small bore portion 53 and an outer peripheral surface formed with an on-off valve thread portion 56. The on-off valve thread portion 56 is configured to be threadingly engageable with the seat block housing 43. A major part of the plunger 45 is slidably fitted into the inner periphery of the second on-off valve housing portion 49b along the axis L1. The third on-off valve housing portion 49c is formed into a cylindrical shape having its outer periphery smaller in diameter than the outer periphery of the second on-off valve housing portion 49b and protrudes from a second (opposite) axial end portion of the second on-off valve housing portion 49b in the first axial direction X1. The third on-off valve housing portion 49c is formed so that its inner peripheral surface is substantially flush with the inner peripheral surface of the second on-off valve housing portion 49b and defines an on-off valve channel 57 extending thicknesswise therethrough. A part of the plunger 45 is displaceably accommodated in the third on-off valve housing portion 49c. In the large bore portion 55 of the first on-off valve housing portion 49a, a non-magnetic member 58 protruding in the second (opposite) axial direction is provided. The non-magnetic member 58 is shaped cylindrical having an inner diameter substantially equal to that of the second on-off valve housing portion 49b and configured to hold the solenoid 52 located in the large bore portion 55. The on-off valve housing 49 thus configured forms an on-off valve insert hole portion 59 defining an insert hole extending axially therethrough to allow the plunger 45 to be inserted therein, accommodates the solenoid 52 in the large bore portion 55, and fixes the fixed magnetic pole 50 fitted in the medium bore portion 54. In the following description related to the on-off valve housing 49, an axial end portion lying on the first on-off valve housing portion 49a side will be referred to as first axial end portion, while an axial end portion lying on the third on-off valve housing portion 49c side will be referred to as second (opposite) axial end portion.

The plunger 45, which is a valve body, comprises a ferromagnetic material and is shaped substantially cylindrical. A first axial end portion of the plunger 45 is formed with an axially dented plunger spring seat portion 60. The plunger spring seat portion 60 is shaped circular in a section cut along an imaginary plane perpendicular to the axis and configured to abut and support a first axial end portion of the on-off valve spring member 51. The second axial end portion of the plunger 45 forms a step and has a smaller diameter than that of the first axial end portion of the plunger 45. That is, an on-off valve space 105 is defined mainly by the third on-off valve housing portion 49c, the smaller-diameter portion of the plunger 45 and the seat block 44. The second axial end portion of the plunger 45 is formed with a substantially annular on-off valve body piece 62 protruding in the axial direction X1. The shape expressed by "substantially annular" is meant to include a shape expressed by "annular". The plunger 45 is inserted into the on-off valve insert hole portion 59 so that the plunger spring seat portion 60 on the first axial end portion side of the plunger 45 is positioned on the first axial end portion side of the on-off valve housing 49, and the on-off valve body piece 62 on the second axial end portion side of the plunger 45 is positioned on the second axial end portion side of the on-off valve housing 49. Thus, the plunger 45 is held in the on-off valve housing 49. In this condition, the plunger 45 is displaceable in the axial direction X1 and in the second axial direction X2 by sliding along the axis L1.

The fixed magnetic pole 50 comprises a ferromagnetic material and is shaped substantially cylindrical. The fixed magnetic pole 50 has a first axial end portion 64 fixedly fitted in the medium bore portion 54 and defines a step in the axial direction X2. The fixed magnetic pole 50 has a second axial end portion 65 having a smaller diameter than that of the axial end portion 64 and shaped so as to be fitted in the non-magnetic member 58. The second axial end portion 65 of the fixed magnetic pole 50 is formed with a fixed magnetic pole spring seat portion 63 which is dented axially. The fixed magnetic pole spring seat portion 63 is shaped circular in a section cut along an imaginary plane perpendicular to the axis and configured to abut and support the second axial end portion of the on-off valve spring member 51. The fixed magnetic pole 50 is fixed to the on-off valve housing 49 in such a manner that its first axial end portion 64 is fixed to the medium bore portion 54 of the on-off valve housing 49, and the fixed magnetic pole spring seat portion 63 is positioned to face the plunger spring seat portion 60.

The on-off valve spring member 51 is a compression coil spring having a first end portion fitted in the plunger spring seat portion 60 and a second end portion fitted in the fixed magnetic pole spring seat portion 63. Thus, the on-off valve spring member 51 intervenes between the plunger 45 and the fixed magnetic pole 50 and has its first axial end portion contacted and supported by the plunger spring seat portion 60 and its second axial end portion contacted and supported by the fixed magnetic pole spring seat portion 63. The on-off valve spring member 51 applies the plunger 45 with a spring force in the axial direction X1 relative to the on-off valve housing 49 and the fixed magnetic pole 50.

The solenoid 52 comprises a cylindrical coil bobbin 66 formed from a ferromagnetic material, and a coil 67 wound around the coil bobbin 66 about the axis L1. With the coil 67 of the solenoid 52 in a state not supplied with driving current I, the plunger 45 is positioned to be pressed on the seat block 44 by the spring force of the on-off valve spring member 51 working in the axial direction X1. When the coil 67 of the solenoid 52 is supplied with driving current I, the plunger 45 is displaced in the second axial direction X2 by an electromagnetic force working in the second axial direction X2 against the spring force of the on-off valve spring member 51 working in the axial direction X1 so as to be positioned apart from the seat block 44. By thus supplying and stop supplying the solenoid 52 with driving current I, the solenoid 52 and the on-off valve spring member 51 cooperate to exert the electromagnetic force and the spring force on the plunger 45 to displace the plunger 45, thereby making it possible to control the pressed condition of the plunger 45.

The pressure reducing valve section 42, together with the seat block housing 43 and the seat block 44, forms a pressure reducing valve 68 located intermediately of the flow path through which fluid flows from the supply side down to the outlet side and configured to reduce the primary pressure of fluid supplied to the secondary pressure which is lower than the primary pressure. The pressure reducing valve section 42 comprises a pressure reducing valve housing 69, piston 46, pressure reducing valve spring member 70, and rod 71. The pressure reducing valve housing 69, piston 46, pressure reducing valve spring member 70 and rod 71 are arranged coaxially with each other, and the axes of respective of these components are substantially coincident with the axis L1 of the pressure reducing valve section.

The pressure reducing valve housing 69, which is one of the housing members, has a substantially bottomed cylindrical shape. The pressure reducing valve housing 69 has an open end portion 72 which defines a step and has a smaller diameter than that of the rest. The outer periphery of the open end portion 72 is formed with a pressure reducing valve thread portion 73 configured to be capable of thread engagement with the seat block housing 43. The pressure reducing valve housing 69 has an open hole portion 75 which opens axially to allow a piston part 74 to be inserted therethrough, and a piston body receiving hole portion 77 for receiving a piston body 76 inwardly, these hole portions 75 and 77 being arranged along the axis L1. The piston body receiving hole portion 77 is smaller in diameter than that of the open hole portion 75. The open hole portion 75 is formed with a radially outwardly dented groove portion extending over the entire circumference thereof. This housing groove portion is configured to allow a seal member to be fitted therein.

The piston 46, which is a valve body, includes the piston part 74 and the piston body 76 formed integrally with the piston part 74. The piston part 74 is shaped substantially cylindrical and has a first axial end portion forming a step. The first axial end portion of the piston 46 is formed with a substantially annular pressure reducing valve body piece 79 protruding in the second axial direction X2, while a second axial end portion of the piston part 74 forms the piston body 76.

The piston body 76 is shaped cylindrical and positioned coaxially with the piston part 74 and is larger in outer diameter than that of the piston part 74. The piston body 76 has an outer peripheral surface formed with a radially inwardly dented piston groove portion extending over the entire circumference thereof and receiving a seal member fitted therein. The piston body 76 is slidably held in the piston body receiving hole portion 77 for displacement. The piston 46 defines therein a rod insert hole portion 80 in which the rod 71 is partially inserted for sliding displacement, and a communication hole 81 opening in the second axial direction and communicating with the rod insert hole portion 80, the rod insert hole portion 80 and the communication hole 81 being arranged along the axis L1. The rod insert hole portion 80 and the communication hole 81 are coaxial with each other, and the communication hole 81 is smaller in diameter than that of the rod insert hole portion 80. The piston 46 defines a piston channel 82 extending axially therethrough from the first axial end portion to the second axial end portion of the piston 46.

The piston 46 is housed in the pressure reducing valve housing 69 in such a manner that: the pressure reducing valve piece 79 is positioned outwardly of the pressure reducing valve housing 69; the piston body 76 is slidably fitted in the piston body receiving hole portion 77 for displacement along the axis L1; and the piston part 74 is partially inserted in the open hole portion 75 so as to be capable of sliding for displacement along the axis L1. The piston 46 thus held in the pressure reducing valve housing 69 is capable of sliding displacement in the axial directions X1 and X2 along the axis L1.

With the piston 46 thus positioned in the pressure reducing valve housing 69, the piston body 76, the piston body receiving hole portion 77 and the piston part 74, in combination, define a substantially annular pressure reducing valve spring receiving space 83 formed in a radially outward position of the piston part 74. The pressure reducing valve spring receiving space 83 is capable of accommodating the pressure reducing valve spring member 70 as fitted over the piston part 74. The pressure reducing valve spring receiving space 83 is open to the atmosphere through an open-to-atmosphere hole 84 defined by the pressure reducing valve housing 69.

The pressure reducing valve spring member 70 is a compression coil spring disposed within the pressure reducing valve spring receiving space 83 and accommodated as fitted over the piston 46 in the pressure reducing valve housing 69. The pressure reducing valve spring member 70 has a first axial end portion abutting against and supported by a piston body spring seat portion 85 and a second axial end portion abutting against and supported by a receiving hole spring seat portion 86. The piston body spring seat portion 85 is a portion of the piston body 76 exposed to the pressure reducing valve spring receiving space 83, while the receiving hole spring seat portion 86 is a portion of the piston body receiving hole portion 77 exposed to the pressure reducing valve spring receiving space 83. The pressure reducing valve spring member 70 is capable of applying the piston 46 with a spring force working in the axial direction X1 relative to the pressure reducing valve housing 69.

The rod 71 having a substantially columnar shape is held within the pressure reducing valve housing 69 and has a first axial end portion inserted into the rod insert hole portion 80 for sliding displacement relative to the piston 46 in the axial directions X1 and X2 along the axis L1. The rod 71 is positioned with at least its second axial end portion 85 protruding from the piston 46. The second axial end portion 85 is formed to have a larger outer diameter than that of the rest and configured to be capable of supporting an open end portion 86 of the rod insert hole portion 80 of the piston 46 along the axis. An annular space 87 connected to the piston channel 82 is defined to extend radially outwardly of the second axial end portion 85. The first axial end portion of the rod 71 has an outer peripheral portion brought into contact with an inner peripheral portion of the piston 46 to provide sealing, thereby defining a back-pressure chamber 88 between the piston 46 and the rod 71 which is connected to the communication hole 81.

The seat block housing 43, which is one of the housing members, is shaped cylindrical and has an open end portion 90 oriented in the axial direction X1 (hereinafter will be referred to as "a first open end portion 90" as the case may be) to which the pressure reducing valve section 42 is secured by thread engagement, and an open end portion 89 oriented in the second axial direction X2 (hereinafter will be referred to as "second open end portion 89" as the case may be) to which the on-off valve section 41 is secured by thread engagement. The seat block housing 43 has an axially intermediate portion formed with a seat block holding portion 92 protruding radially inwardly and extending over the entire circumference (see FIG. 1). The seat block holding portion 92 has an open end portion oriented toward the axial direction X2 which is formed with a step portion 93 dented radially outwardly and extending over the entire circumference. The seat block 44 is fitted in the seat block holding portion 92. The seat block housing 43 defines a supply channel 94 for supplying fluid in the axial direction X2 from the seat block holding portion 92, and an outlet channel 95 for outputting supplied fluid in the axial direction X1 from the seat block holding portion 92.

The seat block 44 comprises a cylindrical seat block body 97 having a first axial end portion forming a flange portion 96 protruding radially outwardly and extending over the entire circumference, and seat-forming members 101. The seat block body 97 serving as a base comprises a bard material such as stainless steel or brass for example and defines a valve bore 98 extending therethrough along the axis L1 and having a step at an axially intermediate portion. The seat block 97 may be formed from a soft material such as resin without limitation to the hard material.

The first axial end portion of the seat block 44 defines an axially dented and substantially annular groove formed to circumscribe the valve bore 98. A substantially annular on-off valve seat-forming member 99 is fitted in this groove portion to form an on-off valve seat portion 47a. A second axial end portion of the seat block 44 defines an axially dented and substantially annular groove formed to circumscribe the valve bore 98. A substantially annular pressure reducing valve seat-forming member 100 is fitted in this groove portion to form a pressure reducing valve seat portion 47b. The on-off valve seat-forming member 99 comprises rubber or resin and is fixedly fitted on the seat block body 97 by being adhered to the groove portion defined at the first axial end portion of the seat block 97. The on-off valve seat-forming member 99 may comprise any soft material, for example, a soft metal such as copper without limitation to rubber or resin. Likewise, the pressure reducing valve seat-forming member 100 comprises rubber or resin and is fixedly fitted on the seat block body 97 by being bonded to the groove portion defined at the second axial end portion of the seat block 97. Like the on-off valve seat-forming member 99, the pressure reducing valve seat-forming member 100 may comprise any soft material, for example, a soft metal such as copper without limitation to rubber or resin. The seat-forming members 101 include the on-off valve seat-forming member 99 and the pressure reducing valve seat-forming member 100. The seat portions 47 include the on-off valve seat portion 47a and the pressure reducing valve seat portion 47b. The seat block body 97 has an outer peripheral portion defining a seat block body groove portion dented radially inwardly and extending over the entire circumference, in which groove portion a seal member 103 is fitted.

The seat block 44 is fitted in the seat block holding portion 92 in such a manner that the portion of the seat block 44 other than the flange portion 96 is fitted in the portion of the seat block holding portion 92 other than the step portion 93, while the flange portion 96 fitted in the step portion 93. With the seat block 44 thus fitted in the seat block holding portion 92, the on-off valve seat portion 47a allows the plunger 45 to be pressed thereon. The on-off valve seat-forming member 99 is opposed to the on-off valve body piece 62 and fitted on the seat block body 97 so as to abut the plunger 45 in a condition pressed on the on-off valve seat portion 47a. The pressure reducing valve seat portion 47b is configured to allow the piston 46 to be pressed thereon. The pressure reducing valve seat-forming member 100 is faced to the pressure reducing valve body piece 79 and fitted on the seat block body 97 so as to abut the piston 46 in a condition pressed on the pressure reducing valve seat portion 47b. Between the pressure reducing valve seat portion 47b and the piston 46 in a spaced-apart condition, the pressure reducing valve seat portion 47b and the pressure reducing valve body piece 79 define a substantially annular orifice 102. Further, the seat block 44 provides sealing by means of the seat block holding portion 92 and the seal member 103.

The on-off valve section 41 is secured to the second open end portion 89 of the seat block housing 43 by thread engagement. When the on-off valve section 41 threadingly engages the second open end portion 89 of the seat block housing 43, the second axial end portion of the third on-off valve housing portion 49c abuts and presses against the seat block 44 fitted in the seat block holding portion 92. As a result, the flange portion 96 of the seat block 44 is held between the step portion 93 of the seat block holding portion 92 and the on-off valve housing 49, so that the seat block 44 is fixedly held in the seat block holding portion 92. The pressure reducing valve section 42 is secured to the first open end portion 90 of the seat block housing 43 by thread engagement. By thus fitting the seat block 44 into the seat block housing 43 and bringing the on-off valve section 41 and the pressure reducing valve section 42 into thread engagement with the seat block housing 43, the valve device 40 is formed. The on-off valve housing 49, the pressure reducing valve housing 69 and the seat block housing 43 thus threadingly engaged with each other form the housing 104 of the valve device 40.

In the valve device 40 thus constructed, the seat block housing 43, the seat block 44 and the on-off valve section 41, in combination, define the substantially annular on-off valve space 105 connected to the supply channel 94 and to the valve bore 98 through the on-off valve channel 57. Also, the seat block housing 43, the seat block 44 and the pressure reducing valve section 42, in combination, define the substantially annular pressure reducing valve space 106 connected to the outlet channel 95 and to the valve bore 98. Further, the pressure reducing valve space 106 connected to the back-pressure chamber 88 through the communication hole 81 and to the space 87 through the piston channel 82. Thus, the valve path 107 of the valve device 40 is formed comprising the supply channel 94, the on-off valve space 105, the valve bore 98, the pressure reducing valve space 106 and the outlet channel 95. In the valve path 107 thus formed, fluid flows from the supply channel 94, through the on-off valve space 105, the valve bore 98 and the pressure reducing valve space 106 down to the outlet channel 95. A valve bore portion 108 defining the valve bore 98 has a step formed at an axially intermediate location which is capable of regulating the flow of fluid passing through the valve bore 98 downstream. Though only one valve path is formed in the present embodiment, it is possible to form plural valve paths without any particular limitation to the single valve path.

With the valve device 40 thus constructed, by supplying and stop supplying the solenoid 52 with driving current I, the solenoid 52 and the on-off valve spring member 60 cooperate to exert the electromagnetic force and the spring force on the plunger 45 to displace the plunger 45, thereby controlling the pressed condition of the plunger 45 on the on-off valve seat portion 47a, hence, controlling the open-close condition of the valve bore 98. Stated otherwise, the valve path 107 can be on-off controlled. Thus, the on-off valve 48 of the valve device 40 is capable of permitting fluid to flow from the supply channel 94 down to the valve bore 98 and stopping the flow. The pressure reducing valve 68 of the valve device 40 acts to reduce the pressure of fluid passing through the orifice 102. Stated otherwise, the primary pressure of fluid flowing down from the valve bore 98 is reduced to the secondary pressure by passage of fluid through the orifice 102, and then fluid is outputted through the outlet channel 95. The piston body 76 of the pressure reducing valve 68 receives the secondary pressure working in the axial direction X2 from fluid in the space 87 as well as the spring force working in the axial direction X1 from the pressure reducing valve spring member 70. When the secondary pressure becomes larger than the spring force applied to the piston 46 by the pressure reducing valve spring member 70, the piston 46 slides in such a direction as to allow the piston 46 to be pressed on the pressure reducing valve seat portion 47b, or as to close the valve path 107. On the other hand, when the secondary pressure becomes smaller than the spring force applied to the piston 46 by the pressure reducing valve spring member 70, the piston 46 slides away from the pressure reducing valve seat portion 47b, or in such a direction as to open the valve path 107. Such sliding displacement of the piston 46 in the directions to open and close the valve path 107 regulates the opening of the valve path 107, i.e., the opening of the orifice 102, thereby regulating the pressure of fluid passing through the orifice 102. The primary pressure exerted on the piston 46 in the axial direction X1 is cancelled when the pressure-receiving area of the back-pressure chamber 88 is made equal to the area encircled by the protruding portion of the pressure reducing valve piece 79.

In the valve device 40 thus constructed, the seat block 44 is configured to allow the plunger 45 and the piston 46 to be pressed thereon. Since the plural valve bodies 45 and 46 can be pressed on the common seat block 44, there is no need to provide plural seat blocks and, hence, the structure of the valve device 40 can be simplified. For this reason, the valve device 40 requires a lower parts count than the conventional valve device, thus making it possible to reduce the manufacturing cost. The seat block 44 fitted in the seat block holding portion 92 is fixedly held between the seat block housing 43 and the on-off valve housing 49. Since the seat block 44 can be fixed by being simply held between the members of the housing 104 in this way, the positioning of the seat block 104 is easy.

Figure 14:
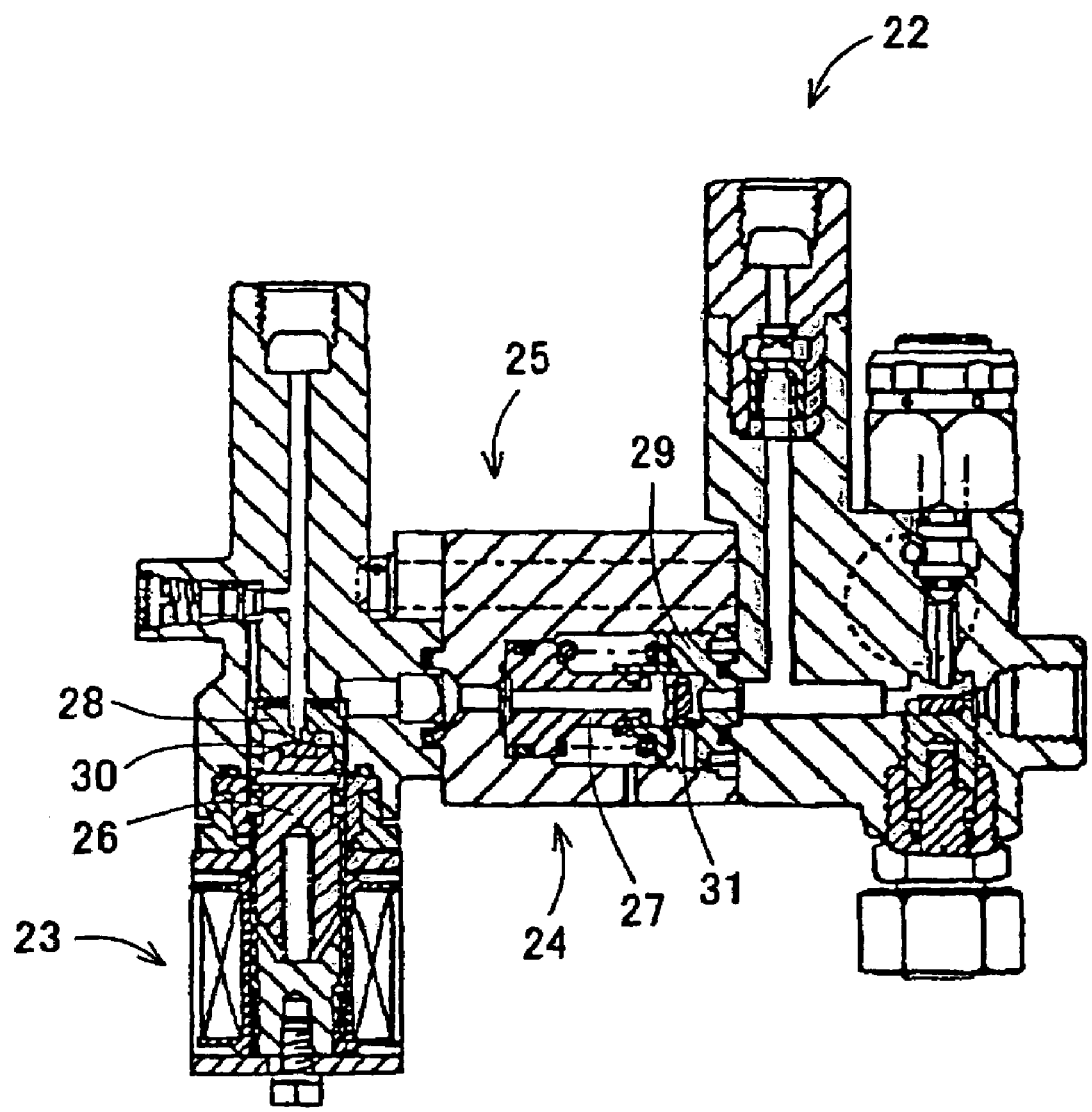
FIG. 14 is a cross-sectional view showing a valve device according to the third prior art.

According to the present embodiment wherein the single common seat block 44 for the plunger 44 and the piston 46 is provided in the housing 104 and, particularly, the valve device is structured to allow the plunger 45 and the piston 46 to be pressed on the respective seat portions 47 of the single seat block 44, the following advantages will result. Plural seat parts, i.e., plural seat blocks 30 and 31 for the plural valve bodies 26 and 27 to be pressed thereon (FIG. 14), which are required of the prior art, are not needed. Stated otherwise, the valve device structured to use the single seat block 44 sharingly has a simplified structure as compared to the conventional valve device 22 (FIG. 14) and hence can reduce the required parts count. Thus, it is possible to reduce the cost of manufacturing the valve device 40.

Since the seat block 44 includes the seat portions 47 each comprising the soft material, there is no need to form seat portions 47 on respective of the plunger 45 and the piston 46 as in the prior art. Accordingly, there is no possibility of damaging the plunger 45 and the piston 46 during the formation of the seat portions 47. Thus, the seat portions can be formed easily without any damage to the plunger 45 and the piston 46. Therefore, it is possible to reduce the man-hour required to form the seat portions 47 and hence realize a reduction in the cost of manufacturing the valve device 40 corresponding to the reduction in the man-hour. The valve device 40 having the structure in which the seat block 44 is fixed to the housing 104 has the following advantages. That is, it is possible to fix the seat block 44 to the housing 104 after the seat portions 47 have been formed on the seat block 44. In this case, the housing 104 itself can have a simplified structure as compared to the case where the housing 104 is formed with the seat portions 47 thereon or the seat block 44 is formed integrally with the housing 104. Thus, it is possible to reduce the mold manufacturing cost and like costs. Moreover, the man-hour required for assemblage of the valve device 40 can be reduced. Additionally, since rubber or resin is bonded to the seat block 44 to form the seat portions 47, the seat portions 47 can be formed easily with high handleability.

According to the present embodiment, the seat-forming members 101 are fitted on the seat block body 97 to form the seat portions 47. By so doing, the seat block 44 including the seat portions 47 each comprising the soft material can be formed easily. Thus, it is possible to realize the seat block 44 by fitting the seat-forming members 101 on the seat block body 97. Since the seat-forming members 101 for forming the seat portions 47 each comprising the soft material are fitted on the seat block body 97 comprising the hard material, the adhesion between the seat block body 97 and the seat-forming members 101 can be enhanced. Therefore, it is possible to form the seat block 44 easily.

According to the present embodiment, the seat block 44 including the seat portions 47 can be realized easily by adhering the seat-forming members 101 to the seat block body 97.

According to the present embodiment, the seat block body 97 is fixed to the housing 104. By so doing, it is possible to realize the fixing of the seat block 44. Also, the seat-forming members 101 are fitted on the seat block body 97 by being held between the seat block body 97 and the housing 104. This arrangement makes it easy to fit the seat-forming members 101 on the seat block body 97. Thus, the seat block 44 can be formed easily.

According to the present embodiment, the seat block 44 can be fixed to the housing 104 by the arrangement wherein the flange portion 96 of the seat block 44 is sandwiched between the on-off valve housing 49 and the seat block housing 43 which are joined together to form the housing 104. This feature makes it possible to fix the seat block 44 at the same time with the assemblage of the housing 104 by joining the plural housing members, namely, the on-off valve housing 49, the pressure reducing valve housing 69 and the seat block housing 43, together. Thus, the seat block 44 can be fixed to the housing 104 easily.

According to the present embodiment, the valve bore 98 serves as the outlet channel of the on-off valve 48 and the supply channel of the pressure reducing valve 68. Accordingly, there is no need to form the outlet channel of the on-off valve 48 and the supply channel of the pressure reducing valve 68 in the housing 104, thus resulting in the valve device 40 simplified in structure. For this reason, it is possible to reduce the required parts count and man-hour, hence, the manufacturing cost.

Figure 3:
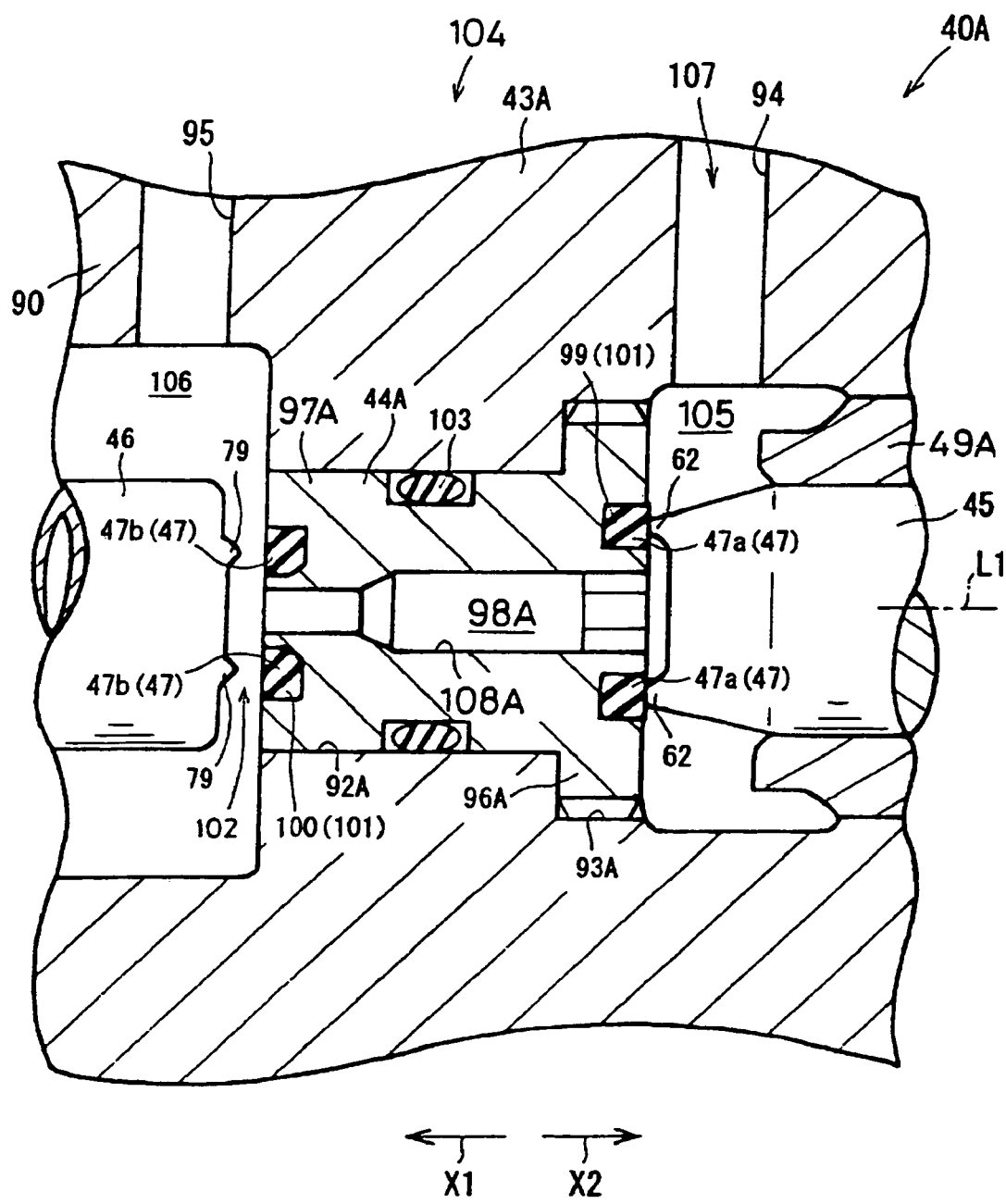
FIG. 3 is a partially enlarged cross-sectional view showing a valve device according to a second embodiment of the present invention.

FIG. 3 is a partially enlarged cross-sectional view showing a valve device 40A according to a second embodiment of the present invention. The valve device 40A is similar to the valve device 40 of the first embodiment. For this reason, description will be made of points of difference only, and like reference characters are used to designate like or corresponding parts to omit the description thereof. The on-off valve housing 49 is not formed with the third on-off valve housing portion 49c (FIG. 2), and the outer periphery of flange portion 96A of seat block 44A is configured to be fixed to step portion 93A of seat block holding portion 92A by thread engagement. Valve bore portion 108A defining valve bore 98A has a first axial end portion defining a hexagonal hole for fixing seat block body 97A to the step portion 93A by thread engagement. This arrangement allows the flange portion 96A to be brought into thread engagement with the step portion 93A without the need to provide a hexagonal clamp portion on the outer periphery of the seat block 44A for example, thereby making it possible to fix the seat block 44A to the seat block holding portion 92A. Since the seat block 44A can be thus fixed to the seat block holding portion 92A by such an easy operation as to bring the seat block 44A into thread engagement with the seat block holding portion 92A, the seat block 44A can be fixedly positioned in seat block housing 43A with a high positional accuracy.

According to the present embodiment, the seat block 44A is fixed to the housing 104 by thread engagement. For this reason, the seat block 44A can be fixed to the housing 104 while being checked for its positional accuracy. Thus, it is possible to realize the valve device wherein the positional accuracy of the seat block 44A relative to each of the housing 104, the plunger 45 and the piston 46 is high.

Figure 4:
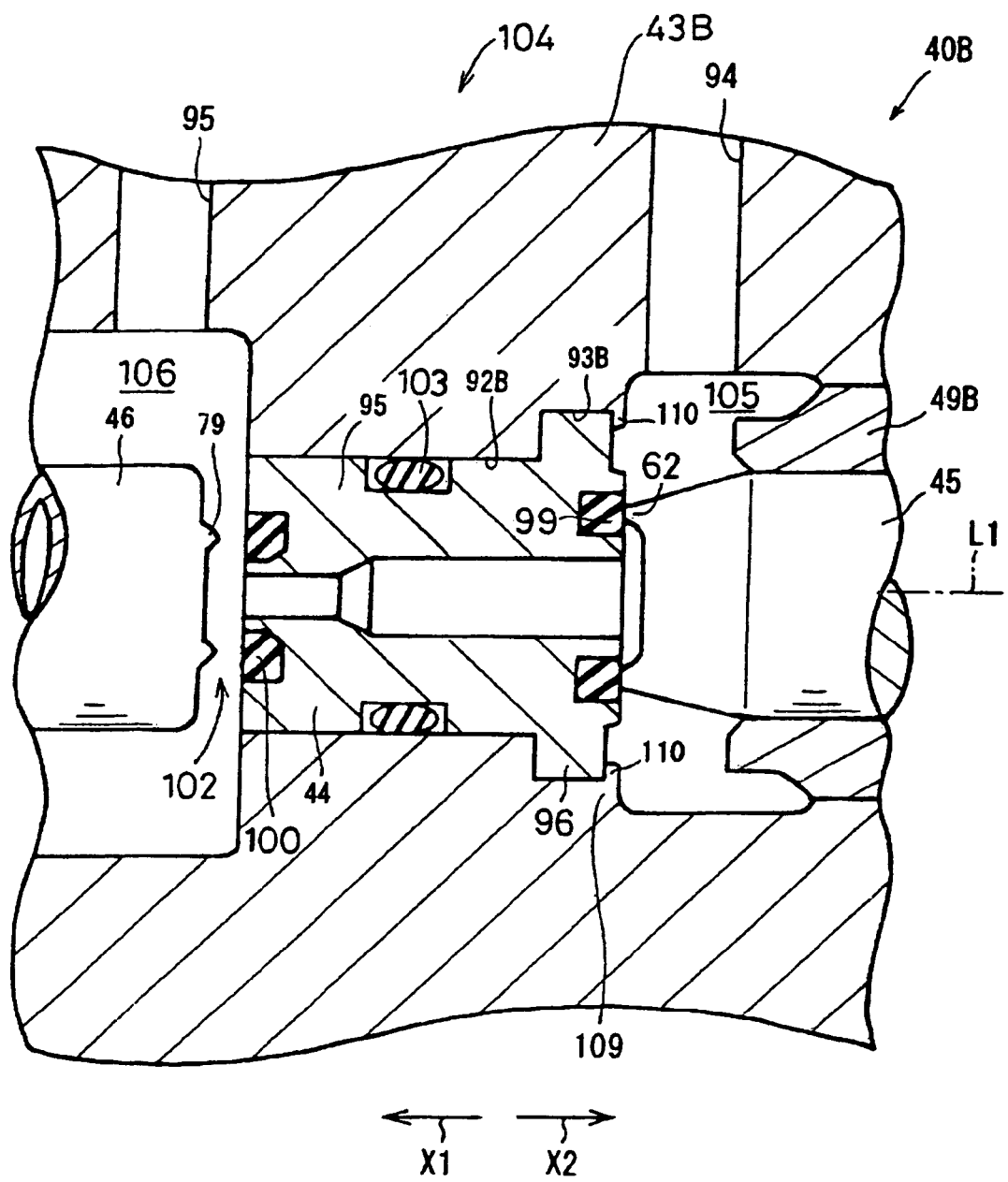
FIG. 4 is a partially enlarged cross-sectional view showing a valve device according to a third embodiment of the present invention.

FIG. 4 is a partially enlarged cross-sectional view showing a valve device 40B according to a third embodiment of the present invention. The valve device 40B is similar to the valve device 40 of the first embodiment. For this reason, description will be made of points of difference only, and like reference characters are used to designate like or corresponding parts to omit the description thereof. On-off valve housing 49B is not formed with the third on-off valve housing portion 49c (FIG. 2), and step portion 93B of seat block holding portion 92B has an open end portion 109 oriented in the second axial direction and provided with plural caulking portions 110 formed by caulking at appropriate intervals along the circumference thereof, the caulking portions 110 projecting radially inwardly. With the seat block 44 fitted in the seat block holding portion 92B, the caulking portions 110 are deformed to fix the flange portion 96 of the seat block 44. Thus, the flange portion 96 fitted in the step portion 93B is fixed thereby allowing the seat block 44 to be fixed to the seat block holding portion 92B, hence, to seat block housing 43B. With the housing 104 thus partially deformed by caulking, the seat block 44 can be easily fixed to the housing 104 with a high positional accuracy.

According to the present embodiment, the seat block 44 is fixed to the housing 104 by partially deforming the housing 104 by caulking. For this reason, the seat block 44 can be fixed to the housing 104 while being checked for its positional accuracy. Thus, it is possible to realize the valve device wherein the positional accuracy of the seat block 44 relative to each of the housing 104, the plunger 45 and the piston 46 is high.

Figure 5:
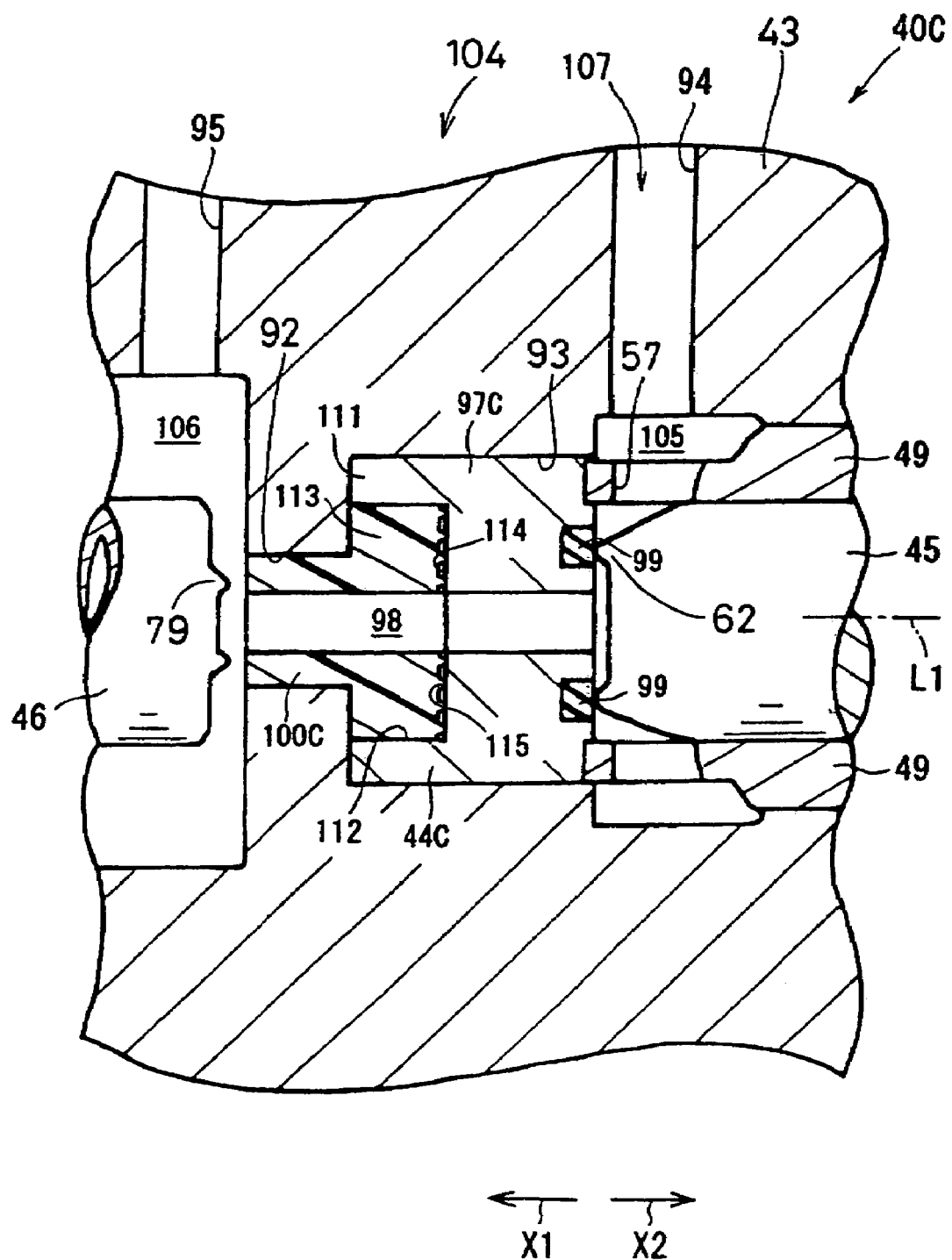
FIG. 5 is a partially enlarged cross-sectional view showing a valve device according to a fourth embodiment of the present invention.

FIG. 5 is a partially enlarged cross-sectional view showing a valve device 40C according to a fourth embodiment of the present invention. The valve device 40C is similar to the valve device 40 of the first embodiment. For this reason, description will be made of points of difference only, and like reference characters are used to designate like or corresponding parts to omit the description thereof. Seat block 44C comprises seat block body 97C, on-off valve seat-forming member 99, and pressure reducing valve seat-forming member 100C. The seat block body 97C is shaped cylindrical and has a first axial end portion defining an axially dented and substantially annular groove portion for the on-off valve seat-forming member 99 to be fitted therein. The seat block body 97C has a second axial end portion 111 defining an axially dented receiving hole portion 112 extending along the axis L1 for the pressure reducing valve seat-forming member 100C to be fitted therein. The seat block body 97C is configured to be capable of fitting in the step portion 93 of the seat block holding portion 92. The pressure reducing seat-forming member 100C is a substantially cylindrical member having a first axial end portion forming a flange portion 113 protruding radially outwardly and extending over the entire circumference thereof. The flange portion 113 is configured to be capable of fitting in the receiving hole portion 112 and to be substantially flush with the second axial end portion 111 of the seat block body 97C with the flange portion 113 fitted in the receiving hole portion 112. The aforementioned condition expressed by "substantially flush with" is meant to include a condition expressed by "flush with". The seat block body 97C has a contact surface portion 114 abutting the pressure reducing seat-forming member 100C, the contact surface portion 114 being formed with a plurality of axially protruding sharp ridges 115. The plural ridges 115 are substantially annular and substantially concentric projections. The plural ridges 115 need not necessarily be formed into substantially annular concentric shapes as long as they form a closed loop. The pressure reducing seat-forming member 100C thus formed is fitted into the receiving hole portion 112 of the seat block body 97C to form the seat block 44C. The seat block 44C defines the valve bore 98 extending through the pressure reducing seat-forming member 100C and the seat block body 97C along the axis L1.

The seat block 44C thus formed is fitted in the seat block holding portion 92 in such a manner that its seat block body 97C is fitted in the step portion 93 while the remainder of the pressure reducing valve seat-forming member 100C other than the portion fitted in the receiving hole portion 112 is fitted in the remainder of the seat block holding portion 92 other than the step portion 93. As in the valve device of the first embodiment, the seat block 44C fitted is fixed by being held between the on-off valve housing 49 and the seat block housing 43. With the seat block 44C thus held between the on-off valve housing 49 and the seat block housing 43, the pressure reducing seat-forming member 100C is held between the seat block body 97C and the seat block holding portion 92. At that time, the plural ridges 115 formed on the contact surface portion 114 are brought into intimate contact with the pressure reducing valve seat-forming member 100C comprising the soft material to achieve sealing. Thus, sealing can be achieved without the need to provide a seal member such as an O-ring.

With the seat block 44C thus fitted, it is possible to fit the pressure reducing valve seat-forming material 100C on the seat block body 97C by merely fitting the pressure reducing valve seat-forming member 100C into the seat block body 97C and then fixing the seat block body 97C to the housing 104. In this way, the pressure reducing valve seat-forming member 100C can be fixed easily. Since the plural ridges 115 formed on the contact surface portion 114 provide sealing, the space required for sealing can be reduced as compared to the case where a seal-forming member, such as an O-ring, is provided to achieve sealing, thus allowing the structure to be simplified. Accordingly, it is possible to lower the parts count and reduce the cost of manufacturing the valve device 40C.

According to the present embodiment, the seat block body 97C and the pressure reducing valve seat-forming member 100C can achieve sealing when the substantially annular sharp ridges 115 formed on the pressure reducing valve seat-forming member 100C are brought into contact with the seat block body 97. This arrangement offers the following advantages. That is, there are decreased limitations in providing sealing as compared to the case where a seal member is used to provide sealing, while at the same time a reduced space is required to achieve sealing. Further, it is possible to simplify the structure of the seat block 44C, lower the parts count and reduce the cost of manufacturing the valve device 40C as compared to the case where such a seal member is used to provide sealing.

According to the present embodiment, the seat block 44C can be fixed to the housing 104 by the arrangement wherein the flange portion 113 of the seat block 44C is held between the on-off valve housing 49 and the seat block housing 43 which are joined together to form the housing 104. This feature makes it possible to fix the seat block 44C at the same time with the assemblage of the housing 104 by joining the plural housing members, namely, the on off valve housing 49; the pressure reducing valve housing 69 (FIG. 2) and the seat block housing 43, together. Thus, the seat block 44C can be fixed to the housing 104 easily.

Figure 6:
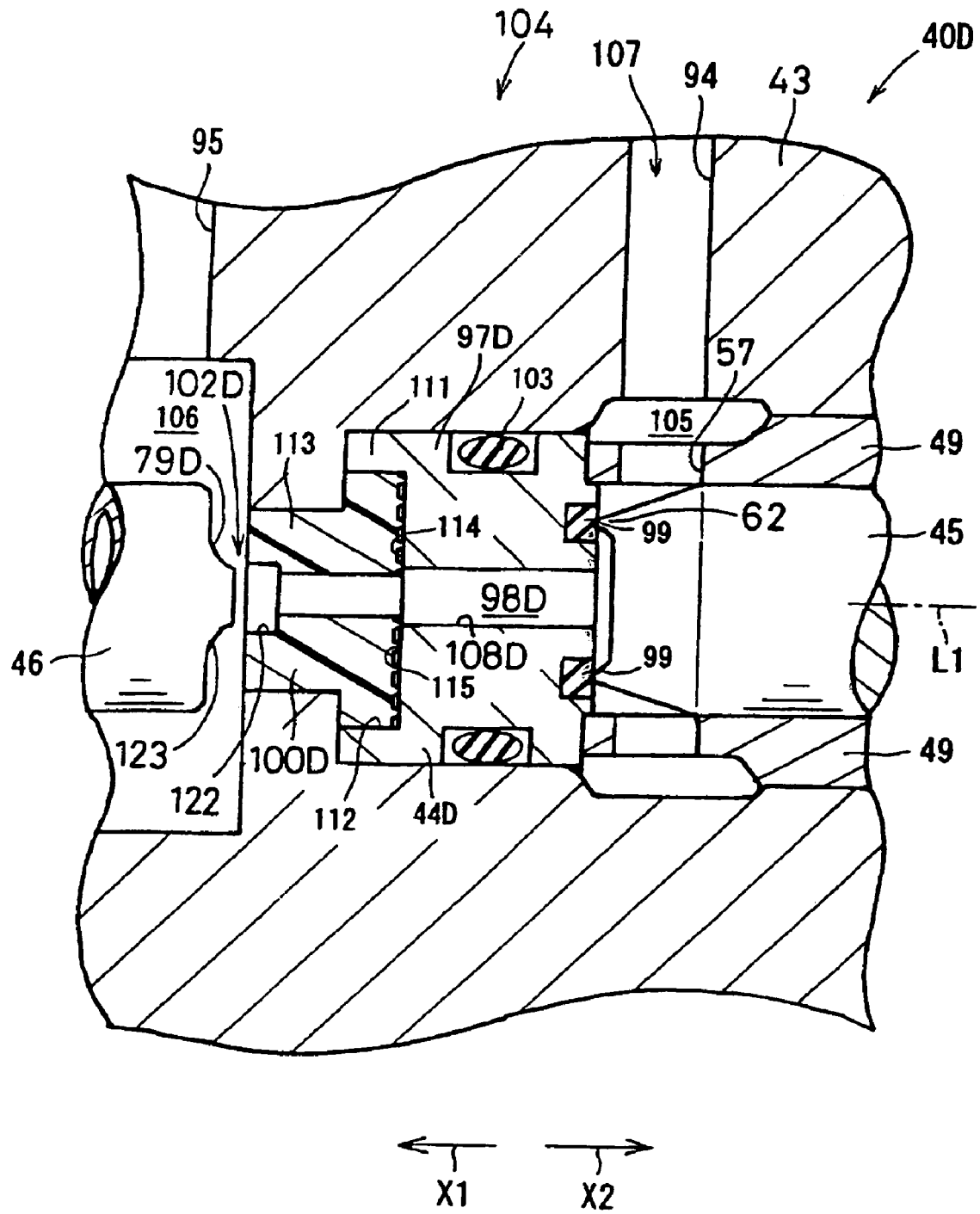
FIG. 6 is a partially enlarged cross-sectional view showing a valve device according to a fifth embodiment of the present invention.

FIG. 6 is a partially enlarged cross-sectional view showing a valve device 40D according to a fifth embodiment of the present invention. The valve device 40D is similar to the valve device 40C of the fourth embodiment. For this reason, description will be made of points of difference only, and like reference characters are used to designate like or corresponding parts to omit the description thereof. Seat block 44D defines valve bore 98D extending through seat block body 97D and pressure reducing valve seat-forming member 100D along the axis L1. Valve bore portion 108D defining the valve bore 98D has an open end portion on the pressure reducing valve side (hereinafter will be referred to as "pressure reducing valve side open end portion 122") configured to be capable of fitting over a pressure reducing valve body piece 79D. The pressure reducing valve body piece 79D is capable of partially fitting into the pressure reducing valve side open end portion 122 and is formed into a truncated conical shape protruding in the axial direction X2 so that its radially outer peripheral surface 123 abuts against the pressure reducing valve side open end portion 122 over the entire circumference of the open end portion 122 when the pressure reducing valve body piece 79D is in the condition fitted in the valve bore portion 108D. The pressure reducing valve body piece 79D closes the valve bore 98D when the pressure reducing valve body piece 79D is in the pressed condition where the pressure reducing valve body piece 79D is fitted in the valve bore portion 108D with its radially outer peripheral surface 123 abutting against the pressure reducing valve side open end portion 122. When the pressure reducing valve body piece 79D is in a condition spaced apart from the valve bore portion 108D; that is, when the radially outer peripheral surface 123D is in a condition spaced part from the pressure reducing valve side open end portion 122, the pressure reducing valve body piece 79D opens the valve bore 98D and defines orifice 102D cooperatively with the pressure reducing valve side open end portion 122. The opening of the orifice 102D thus defined is regulated by sliding displacement of the piston 46 to reduce the primary pressure of fluid passing through the orifice 102D to the secondary pressure. The pressure reducing valve body piece 79D is not limited to the truncated conical shape but may be a substantially annular shape extending along first axial direction L1 as long as its peripheral surface can abut against the pressure reducing valve side open end portion 122 over the entire circumference thereof to close the valve bore 98D when the pressure reducing valve body piece 79D is in the condition fitted in the valve bore portion 108D. The outer periphery of the seat block body 97D is formed with a radially inwardly dented groove portion extending over the entire circumference thereof in which the seal member 103 is provided.

Since the pressure reducing valve body piece 79D presses against the pressure reducing valve side open end portion 122 radially, the pressure reducing valve body piece 79D and the pressure reducing valve side open end portion 122 are brought into contact with each other highly intimately, thus making it possible to close the valve path 107 reliably. This means that this embodiment can ensure a high shutoff effect. Also, the pressure reducing valve body piece 79D and the pressure reducing valve side open end portion 122 cooperates to close the valve path 107 perpendicularly to the flow of fluid. This feature also can enhance the shutoff effect. The seal member 103 provided on the seat block body 97D can cooperate with the ridges 115 to achieve reliable sealing.

Figure 7:
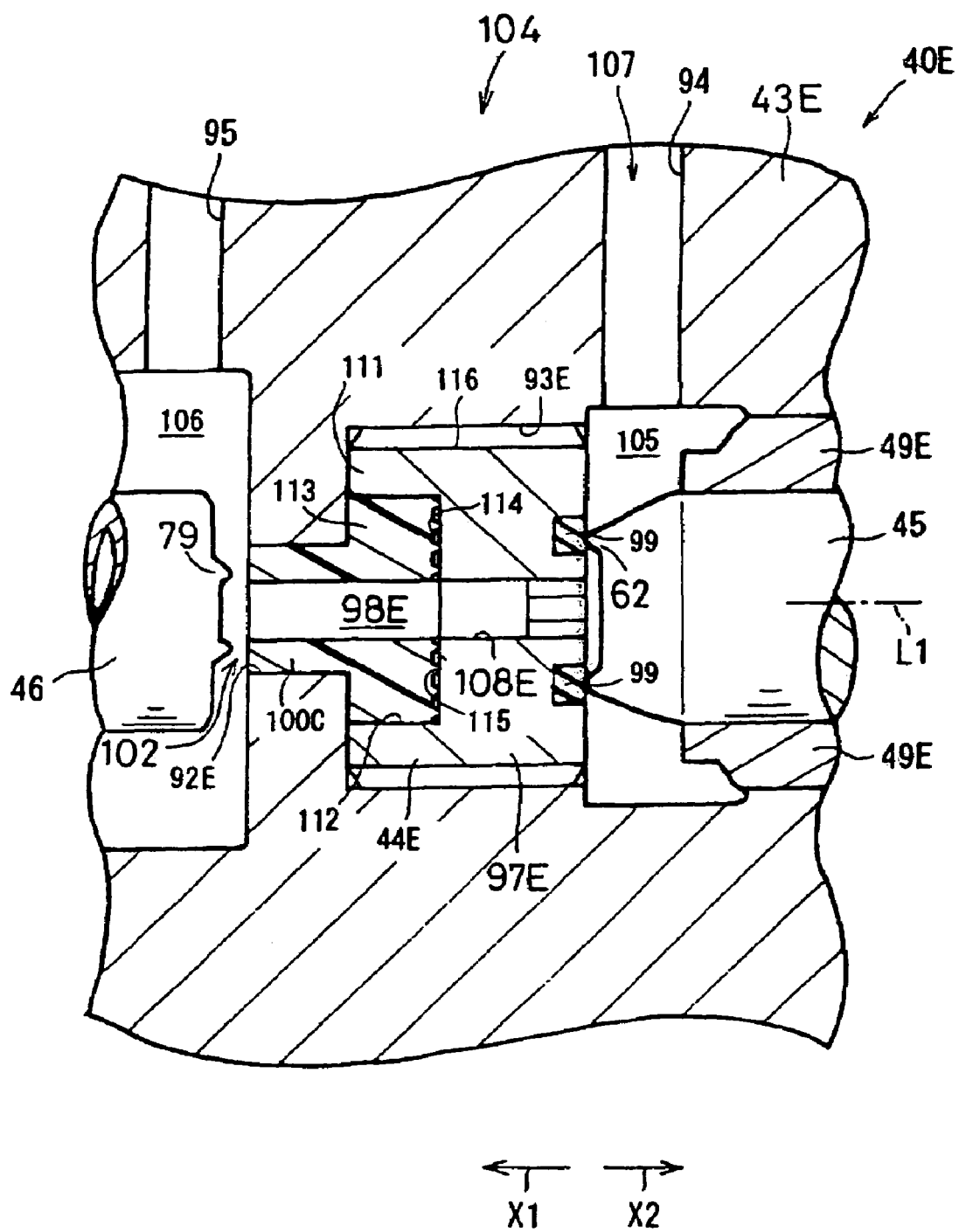
FIG. 7 is a partially enlarged cross-sectional view showing a valve device according to a sixth embodiment of the present invention.

FIG. 7 is a partially enlarged cross-sectional view showing a valve device 40E according to a sixth embodiment of the present invention. The valve device 40E is similar to the valve device 40C of the fourth embodiment. For this reason, description will be made of points of difference only, and like reference characters are used to designate like or corresponding parts to omit the description thereof. On-off valve housing 49E is not formed with the third on-off valve housing portion 49c (FIG. 2), and seat block body 97E has an outer peripheral surface 116 configured to be fixed to step portion 93E of seat block holding portion 92E by thread engagement. Valve bore portion 108E has a first axial end portion defining a hexagonal hole for fixing the seat block body 97E to the step portion 93E by thread engagement. This arrangement allows the seat block body 97E to be brought into thread engagement with the step portion 93E without the need to provide a hexagonal clamp portion on the outer periphery of the seat block 44E for example, thereby making it possible to fix the seat block 44E to the seat block housing 43E with the pressure reducing seat-forming member 100C held between the seat block body 97E and the seat block holding portion 92E. Since the seat block 44E can be thus fixed to the housing 104 by such an easy operation as to bring the seat block body 97E into thread engagement with the step portion 93E, the seat block 44E can be fixedly positioned in the housing with a high positional accuracy.

Figure 8:
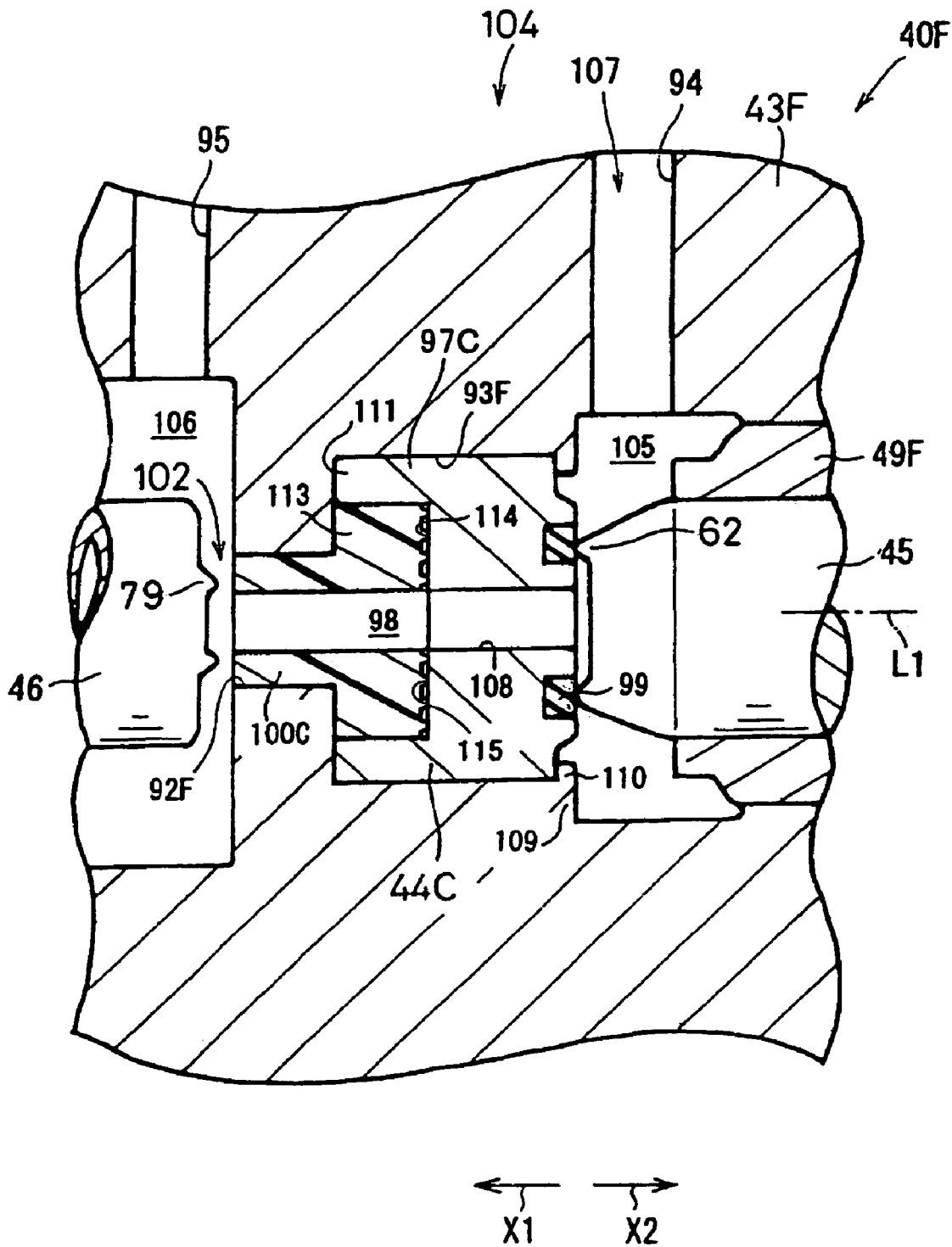
FIG. 8 is a partially enlarged cross-sectional view showing a valve device according to a seventh embodiment of the present invention.

FIG. 8 is a partially enlarged cross-sectional view showing a valve device 40F according to a seventh embodiment of the present invention. The valve device 40F is similar to the valve device 40C of the fourth embodiment. For this reason, description will be made of points of difference only and like reference characters are used to designate like or corresponding parts to omit the description thereof. On-off valve housing 49F is not formed with the third on-off valve housing portion 49c (FIG. 2), and step portion 93F of seat block holding portion 92F has the first open end portion 109 oriented in the second axial direction and provided with plural caulking portions 110 formed at appropriate intervals along the circumference thereof, the caulking portions 110 projecting radially inwardly. With the seat block 44C fitted in the seat block holding portion 92F, the caulking portions 110 are deformed to fix the seat block body 97C. Thus, the seat block body 92F fitted in the step portion 93F is fixed, thereby allowing the pressure reducing seat-forming member 100C to be fixed in the seat block holding portion 92F. Hence, the seat block 100C can be fixed to the housing 104. With the housing 104 thus partially deformed by caulking, the seat block 44C can be easily fixed to the housing 104 with a high positional accuracy.

Figure 9:
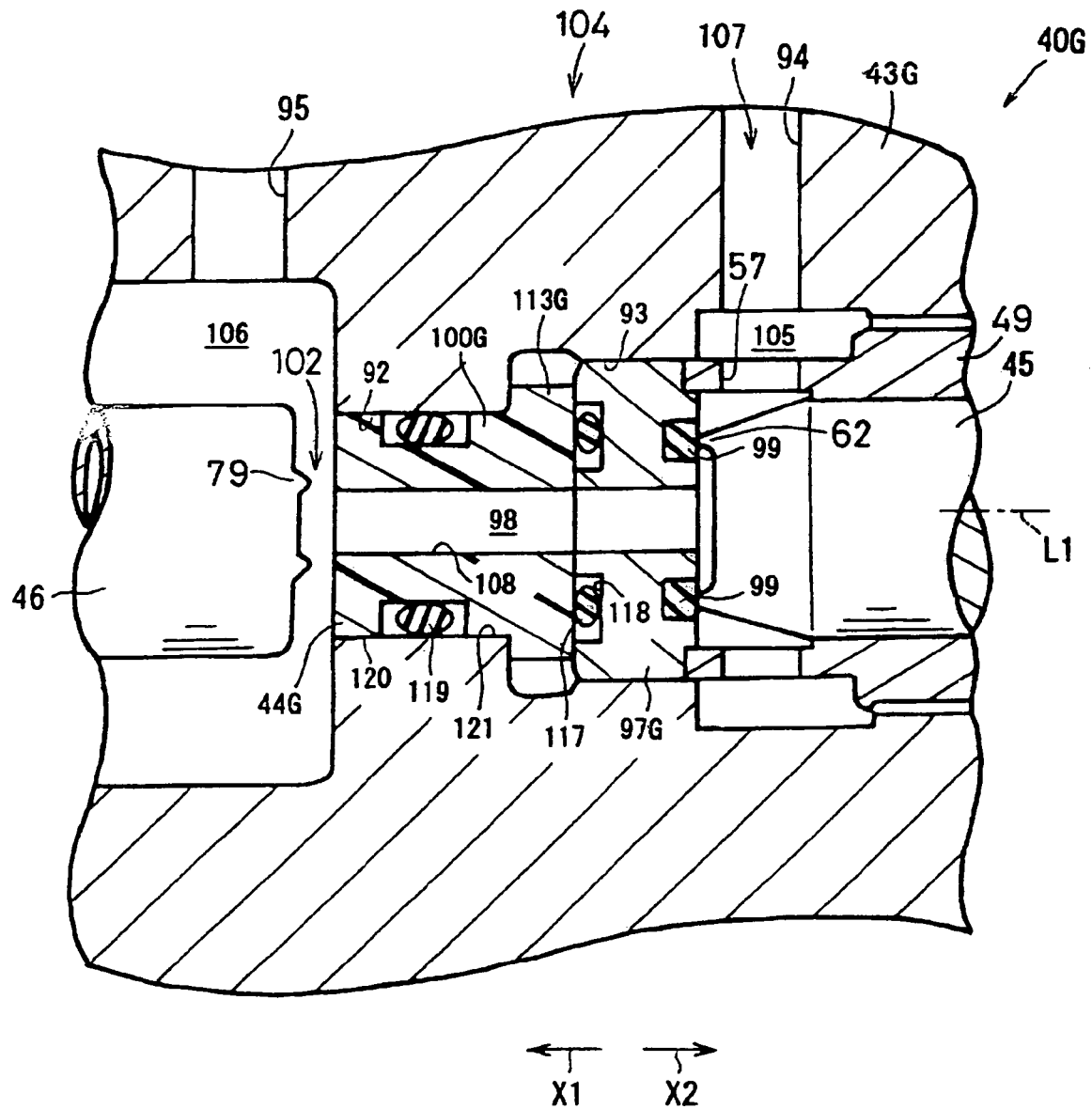
FIG. 9 is a partially enlarged cross-sectional view showing a valve device according to an eighth embodiment of the present invention.

FIG. 9 is a partially enlarged cross-sectional view showing a valve device 40G according to an eighth embodiment of the present invention. The valve device 40G is similar to the valve device 40C of the fourth embodiment. For this reason, description will be made of points of difference only, and like reference characters are used to designate like or corresponding parts to omit the description thereof. Seat block 44G comprises seat block body 97G, on-off valve seat-forming member 99, and pressure reducing valve seat-forming member 100G. The seat block body 97G is shaped cylindrical and configured to be capable of fitting into the step portion 93 of the seat block holding portion 92. The seat block body 97G has a first axial end portion defining an axially dented and substantially annular groove portion for the on-off valve seat-forming member 99 to be fitted therein. The seat block body 97G has a second axial end portion 111 defining an axially dented and substantially annular hole portion 118 extending about the axis L1 for a seal member 117 to be provided therein. The seal member 117 is fitted in the annular hole portion 118 to achieve sealing when the seat block body 97G and the pressure reducing valve seat-forming member 100G are in abutment with each other. The pressure reducing seat-forming member 100G is a substantially cylindrical member having a first axial end portion forming a flange portion 113G protruding radially outwardly and extending over the entire circumference thereof. The remainder 120 of the pressure reducing valve seat-forming member 100G other than the flange portion 113G is configured to be capable of fitting into the remainder 121 of the seat block holding portion 92 other than the step portion 93. The remainder 121 of the seat block holding portion 92 has an outer peripheral surface defining a radially inwardly dented groove portion extending over the entire circumference thereof. A seal member 119 is fitted in this groove portion to provide sealing when the remainder 120 other than the flange portion 113G is in a condition fitted in the remainder 121 of the seat block holding portion 92 other than the step portion 93.

The seat block 44G thus formed is fitted in the seat block holding portion 97G in such a manner that the remainder 120 of the pressure reducing valve seat-forming member 100G is fitted in the remainder 121 of the seat block holding portion 92 while the seat block body 97G fitted in the step portion 93. As in the fourth embodiment, the on-off valve housing 49 presses against the seat block body 97G thus fitted, so that the flange portion 113G of the pressure reducing valve seat-forming member 100G is held between the seat block body 97G and the seat block housing 43G. With the seat block body 97G thus pressed, the pressure reducing seat-forming member 100G can be fixed easily. That is, the seat block 44G can be formed easily. Also, the provision of the seal members 117 and 119 can achieve sealing.

Figure 10:
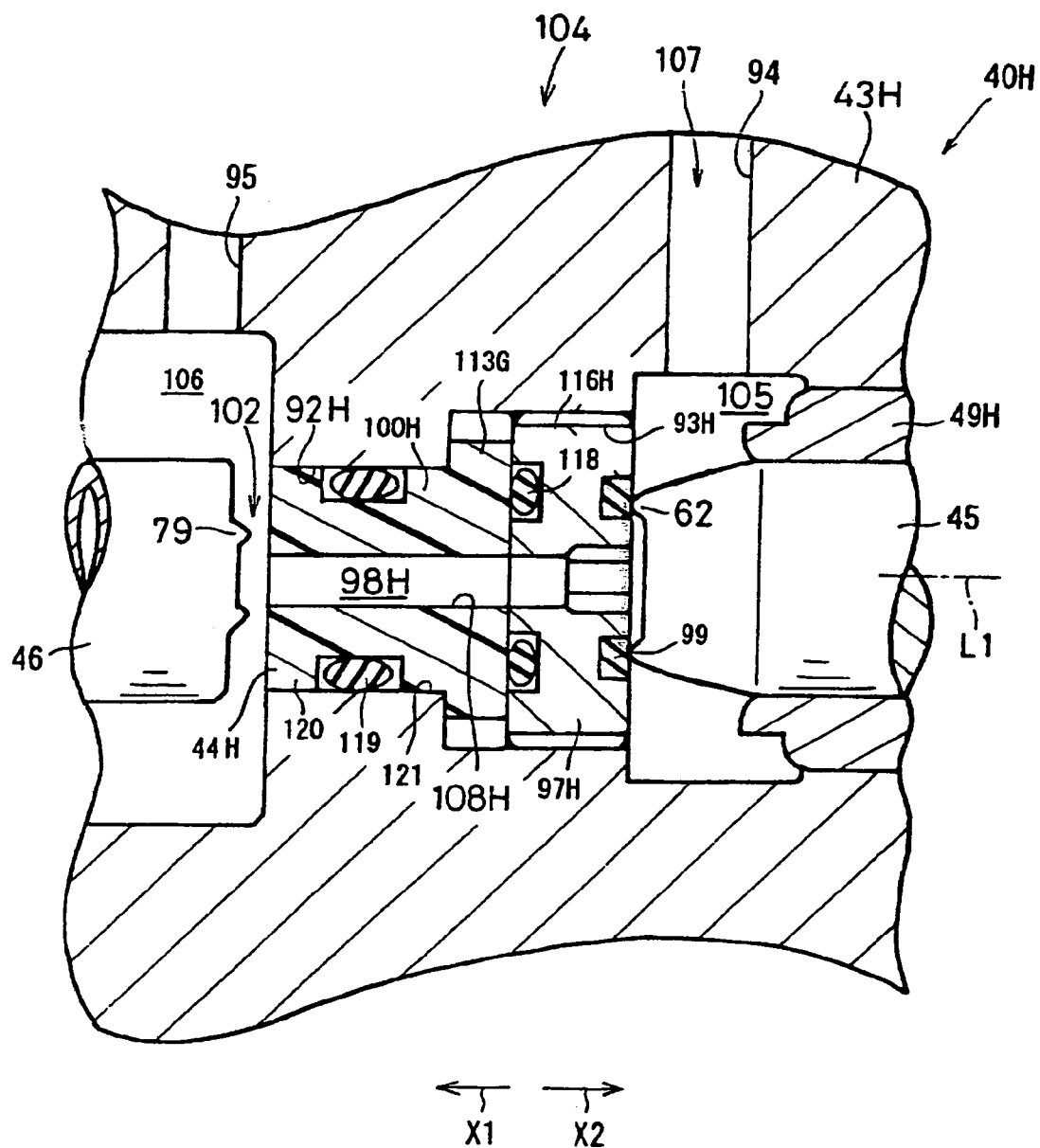
FIG. 10 is a partially enlarged cross-sectional view showing a valve device according to a ninth embodiment of the present invention.

FIG. 10 is a partially enlarged cross-sectional view showing a valve device 40H according to a ninth embodiment of the present invention. The valve device 40H is similar to the valve device 40G of the eighth embodiment. For this reason, description will be made of points of difference only, and like reference characters are used to designate like or corresponding parts to omit the description thereof. On-off valve housing 49H is not formed with the third on-off valve housing portion 49c (FIG. 2), and seat block body 97H has an outer peripheral surface 116H configured to be fixed to step portion 93H of seat block holding portion 92H by thread engagement. Valve bore portion 108H has a first axial end portion defining a hexagonal hole for fixing the seat block body 97H to the step portion 93E by thread engagement. This arrangement allows the seat block body 97H to be brought into thread engagement with the step portion 93H without the need to provide a hexagonal clamp portion on the outer periphery of the seat block 44H for example, thereby making it possible to fix the seat block body 97H to the seat block holding portion 92H. Since the seat block 44H can be thus fixed to the housing 104 by such an easy operation as to bring the seat block body 97H into thread engagement with the seat block holding portion 92H, the seat block 44H can be fixedly positioned in the housing 104 with a high positional accuracy.

Figure 11:
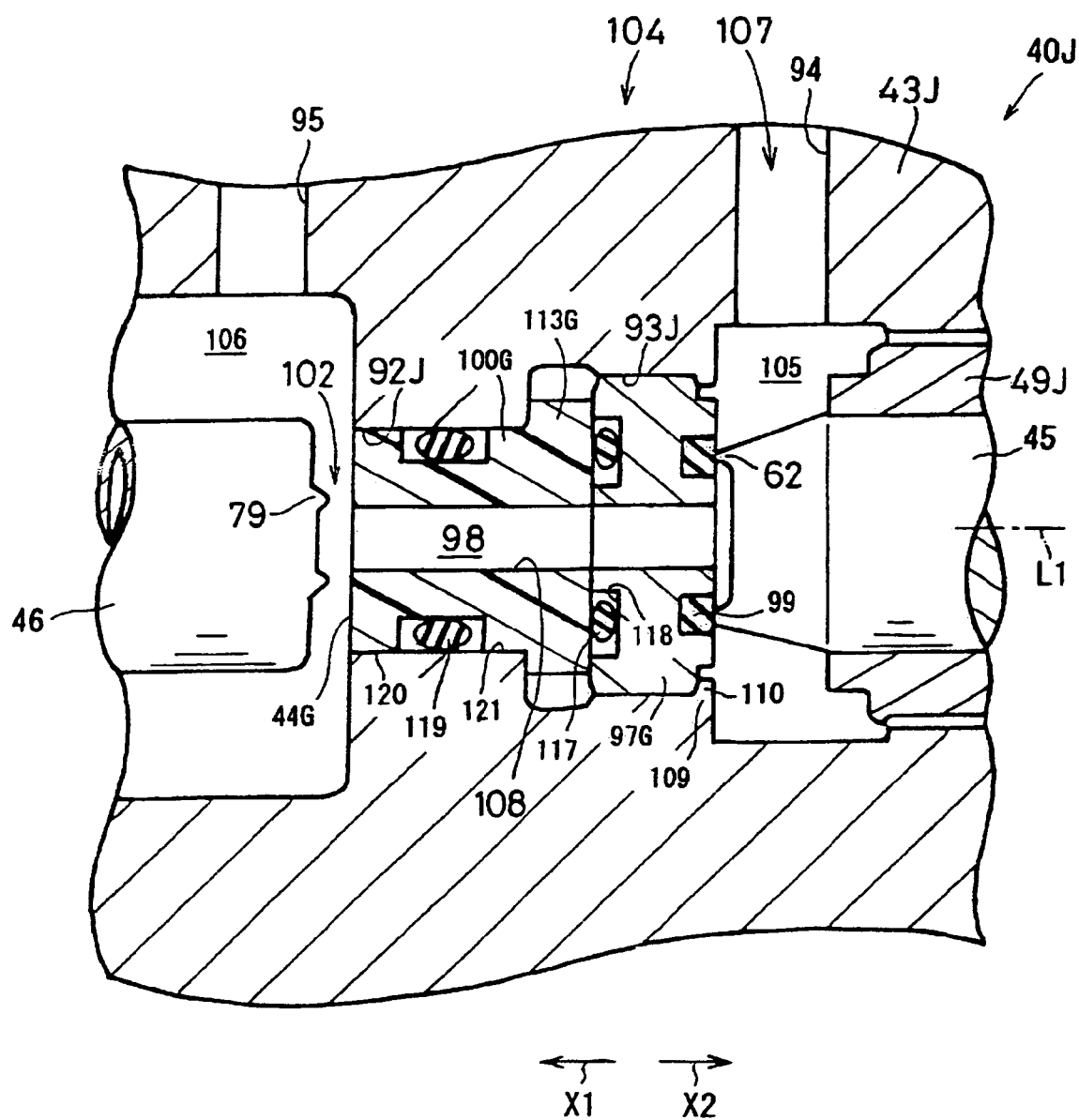
FIG. 11 is a partially enlarged cross-sectional view showing a valve device according to a tenth embodiment of the present invention.
Figure 12:
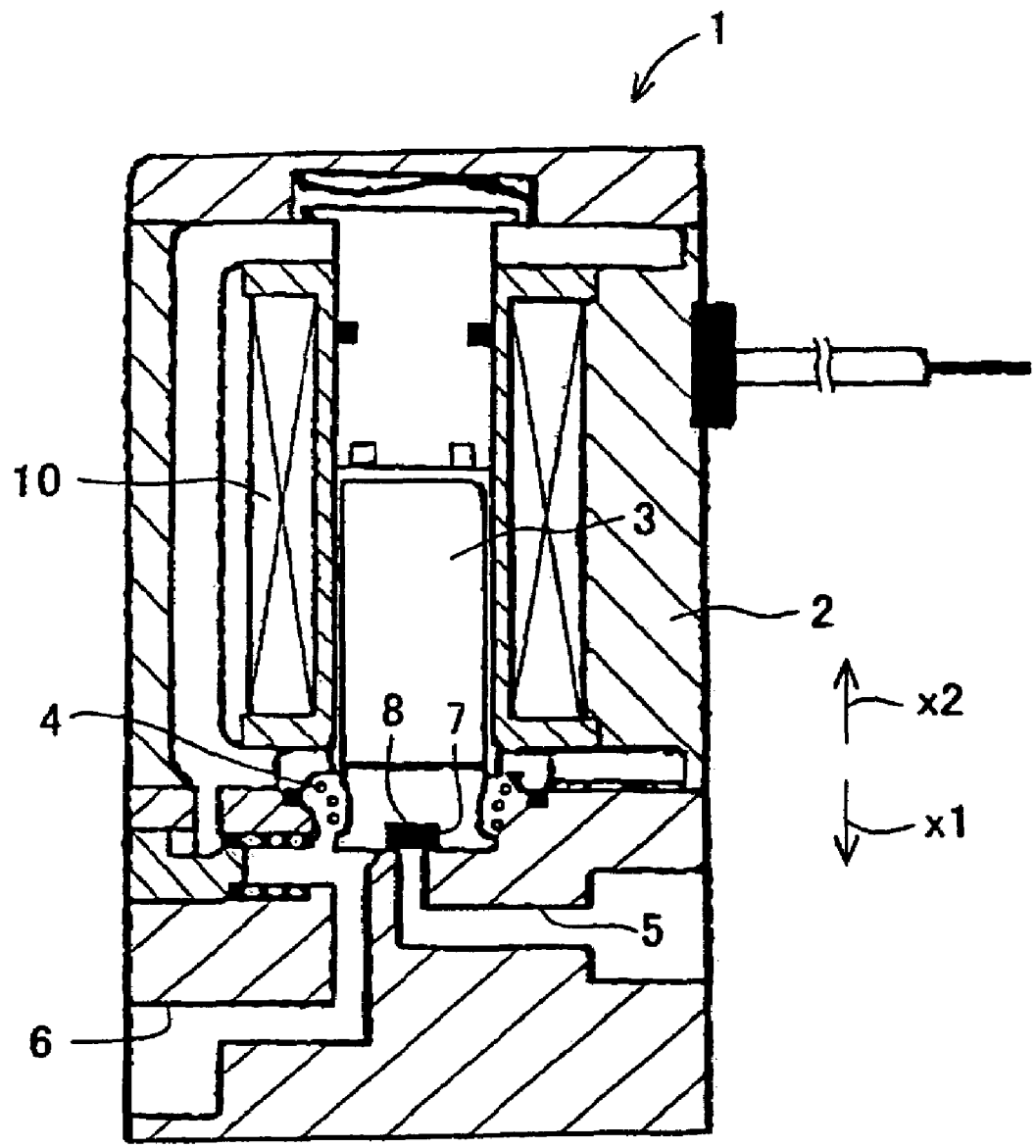
FIG. 12 is a cross-sectional view showing an on-off valve according to the first prior art.
Figure 13:
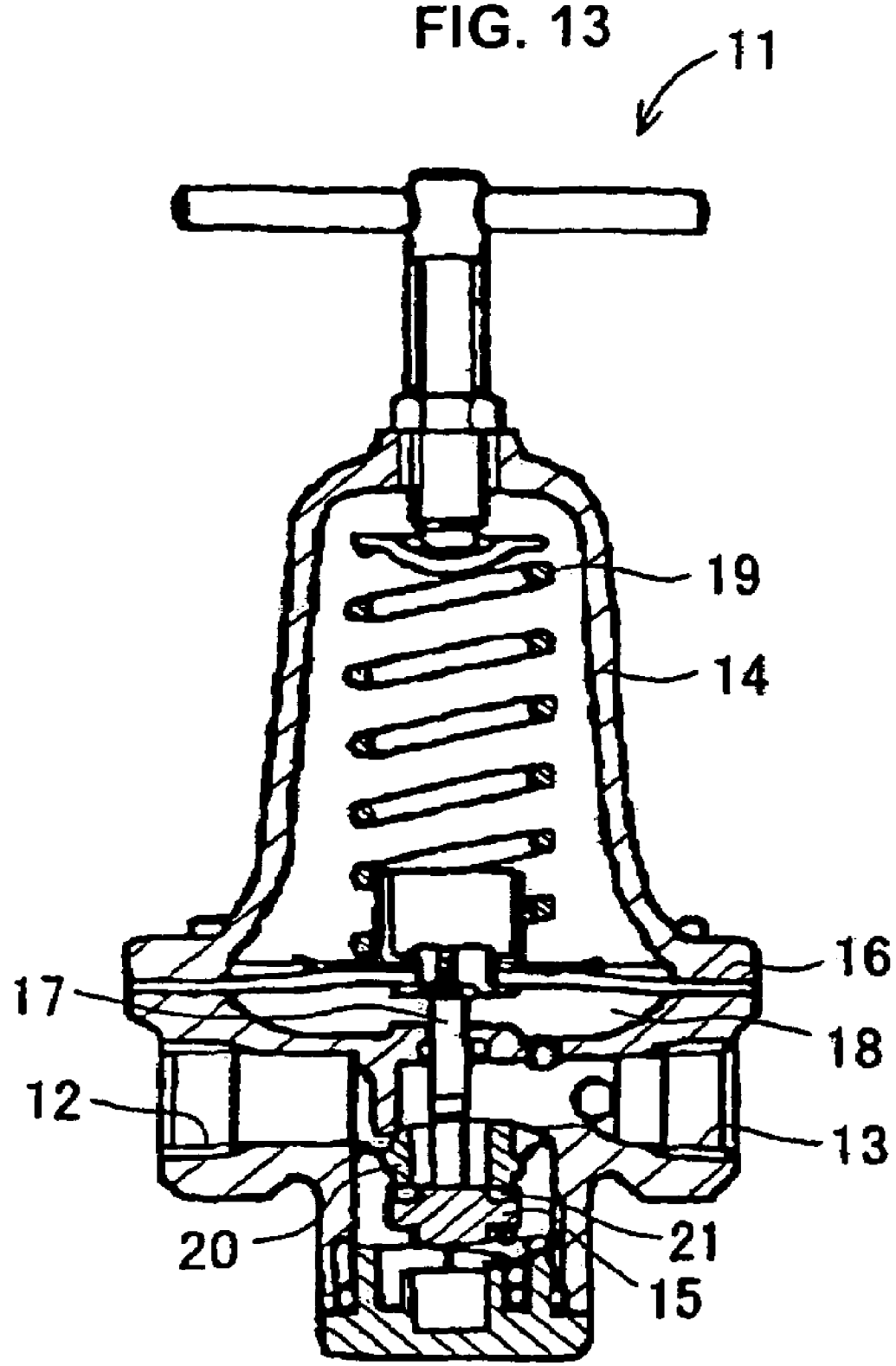
FIG. 13 is a cross-sectional view showing a pressure reducing valve according to the second prior art.

FIG. 11 is a partially enlarged cross-sectional view showing a valve device 40J according to a tenth embodiment of the present invention. The valve device 40J is similar to the valve device 40G of the eighth embodiment. For this reason, description will be made of points of difference only, and like reference characters are used to designate like or corresponding parts to omit the description thereof. On-off valve housing 49J is not formed with the third on-off valve housing portion 49c (FIG. 2), and step portion 93J of seat block holding portion 92J has the open end portion 109 oriented in the second axial direction and provided with plural caulking portions 110 formed at appropriate intervals along the circumference thereof, the caulking portions 110 projecting radially inwardly. With the seat block 44G fitted in the seat block holding portion 92J, the caulking portions 110 are deformed to fix the seat block body 97G. Thus, the seat block body 97G fitted in the step portion 93J is fixed, thereby allowing the seat block 44G to be fixed to the seat block holding portion 92J, hence, to the seat block housing 43J. With the housing 104 thus partially deformed by caulking, the seat block 44J can be easily fixed to the housing 104 with a high positional accuracy.

While the valve device 40 according to any one of the foregoing embodiments includes the pressure reducing valve 48 and the on-off valve 68, there is no particular limitation to the combination of the pressure reducing valve 48 and the on-off valve 68. For example, a combination of two on-off valves or two pressure reducing valves is possible. Though the pressure reducing valve section 42 and the on-off valve section 41 are located as opposed to each other at the opposite ends of the valve bore 98 extending straight, there is no particular limitation to this arrangement. For example, it is possible that the valve bore 98 is L-shaped while the pressure reducing valve section 42 and the on-off valve section 41 positioned so that their respective axes extend perpendicularly to each other. While the valve path 107 has two ports in any one of the foregoing embodiments, a valve path having not less than three ports may be formed. A three-port valve path can be realized if the valve bore 98 is T-shaped for example. In each of the seat blocks 44, 44A, 44C, 44D, 44E, 44G and 44H, the on-off valve seat-forming member 99 may have a structure as follows. The on-off valve seat-forming member 99 may be positioned to face the pressure reducing valve section 42. The pressure reducing valve seat-forming member 100 may be positioned to face the on-off valve section 41. Such an arrangement can exercise a similar effect as in the foregoing embodiments.

INDUSTRIAL APPLICABILITY

The valve device according to the present invention is applicable to a hydraulic apparatus or a like apparatus calling for a valve device which is simplified in structure and can be manufactured with reduced man-hour.

The invention claimed is:

1. A valve device comprising:
a housing in which a valve path is defined;
plural valve bodies displaceably held in said housing for opening and closing said valve path; and
a single common seat block provided for said plural valve bodies and fixed to said housing for said plural valve bodies to be pressed thereon, said seat block having seat portions each comprising a soft material for said valve bodies to be pressed on respective of said seat portions, wherein:
said seat block comprises a base comprising a hard material, a first seat-forming member fitted on said base to form a first one of said seat portions, and a second seat-forming member coupled to said base to form a second one of said seat portions, each of the first and second seat-forming members comprising the soft material;
said base is fixed to said housing;
said second seat-forming member is held between said base and said housing; and
said base and said second seat-forming member provide sealing when a closed loop sharp ridge formed on said base is brought into contact with said second seat-forming member.

2. The valve device according to claim 1, wherein:
said housing comprises plural housing members joined together; and
said seat block has a sandwiched portion and is fixed to said housing by said sandwiched portion sandwiched between said housing members.

3. The valve device according to claim 1, wherein said seat block is fixed to said housing by thread engagement.

4. The valve device according to claim 1, wherein said seat block is fixed to said housing by partial deformation of said housing made by caulking.

5. The valve device according to claim 1, wherein:
the soft material is rubber or resin;
the hard material is stainless steel.

6. The valve device according to claim 5, wherein:
said housing comprises plural housing members joined together; and
said seat block has a sandwiched portion and is fixed to said housing by said sandwiched portion sandwiched between said housing members.

7. The valve device according to claim 5, wherein said seat block is fixed to said housing by thread engagement.

8. The valve device according to claim 5, wherein said seat block is fixed to said housing by partial deformation of said housing made by caulking.

9. A valve device comprising:
a housing defining a valve path;
plural valve bodies displaceably disposed in the housing for opening and closing the valve path; and
a single common seat block provided for the plural valve bodies, the seat block fixed within the housing, each of the valve bodies arranged to shift between an open position spaced away from the seat block and a closed position pressed against the seat block, the seat block comprising a base and having opposed seat portions on opposite sides of the base;
a plurality of seat forming members, each seat forming member coupled to the seat block to form each seat portion, each seat forming member formed of a first material having a first stiffness;
the base of the seat block formed of a second material having a second stiffness, the second stiffness greater than the first stiffness;
at least one of the seat forming members being fitted on the base and secured between a portion of the base and a portion of the housing; and
the base and the at least one seat forming member sealed to one another at a contact surface portion, the contact surface portion including an annular ridge formed on the base and positioned to contact the at least one seat forming member.

10. The valve device of claim 9, wherein the first material is selected from the group consisting of plastic or resin, and wherein the second material is selected from the group consisting of brass or stainless steel.

\* \* \* \* \*